US010382180B2

(12) United States Patent
Suzuki et al.

(10) Patent No.: US 10,382,180 B2
(45) Date of Patent: Aug. 13, 2019

(54) MOBILE STATION APPARATUS, BASE STATION APPARATUS, RADIO COMMUNICATION METHOD AND COMMUNICATION CIRCUIT THAT EXECUTE RADIO COMMUNICATION USING COMPONENT CARRIERS

(71) Applicant: Sharp Kabushiki Kaisha, Sakai, Osaka (JP)

(72) Inventors: Shoichi Suzuki, Sakai (JP); Shohei Yamada, Sakai (JP); Katsunari Uemura, Sakai (JP); Daiichiro Nakashima, Sakai (JP)

(73) Assignee: SHARP KABUSHIKI KAISHA, Osaka-Shi, Osaka (JP)

( * ) Notice: Subject to any disclaimer, the term of this patent is extended or adjusted under 35 U.S.C. 154(b) by 0 days.

(21) Appl. No.: 15/726,270

(22) Filed: Oct. 5, 2017

(65) Prior Publication Data
US 2018/0041974 A1     Feb. 8, 2018

Related U.S. Application Data

(63) Continuation of application No. 14/715,219, filed on May 18, 2015, now Pat. No. 9,820,241, which is a
(Continued)

(30) Foreign Application Priority Data

Jun. 16, 2009    (JP) .................................. 2009-142874

(51) Int. Cl.
*H04W 4/00*       (2018.01)
*H04L 5/00*       (2006.01)
(Continued)

(52) U.S. Cl.
CPC ............ *H04L 5/0053* (2013.01); *H04L 5/001* (2013.01); *H04L 5/0037* (2013.01);
(Continued)

(58) Field of Classification Search
None
See application file for complete search history.

(56) References Cited

U.S. PATENT DOCUMENTS 7,961,700 B2    6/2011   Malladi et al.
8,144,712 B2    3/2012   Love et al.
(Continued)

FOREIGN PATENT DOCUMENTS

JP          2012-517747 A    8/2012
WO    WO 2009/113836 A1    9/2009

OTHER PUBLICATIONS

3GPP, "Technical Specification Group Radio Access Network; Evolved Universal Terrestrial Radio Access (E-UTRA); Multiplexing and channel coding (Release 8)", 3GPP TS 36.212 V8.6.0 (Mar. 2009), pp. 1-59.
(Continued)

*Primary Examiner* — Farah Faroul
(74) *Attorney, Agent, or Firm* — Birch, Stewart, Kolasch & Birch, LLP

(57) ABSTRACT

A mobile station apparatus configures a first group including at least one component carrier and a second group including at least one component carrier. The mobile station apparatus decodes a first physical downlink control channel on a first common search space in a first downlink component carrier and a second physical downlink control channel on a second common search space in a second downlink component carrier where first information transmitted on the first physical downlink control channel is applied to a first uplink component carrier within the first group, and where second
(Continued)

information transmitted on the second physical downlink control channel is applied to a second uplink component carrier within the second group, and where the first downlink component carrier and the second downlink component carrier are indicated by a higher layer.

6 Claims, 22 Drawing Sheets

Related U.S. Application Data continuation of application No. 13/378,409, filed as application No. PCT/JP2010/058750 on May 24, 2010, now Pat. No. 9,072,056.

(51) Int. Cl.
| | |
|---|---|
| *H04W 52/14* | (2009.01) |
| *H04W 52/24* | (2009.01) |
| *H04W 52/32* | (2009.01) |
| *H04W 72/04* | (2009.01) |
| *H04W 52/18* | (2009.01) |
| *H04W 52/58* | (2009.01) |
| *H04W 52/34* | (2009.01) |
| *H04W 88/02* | (2009.01) |
| *H04W 88/08* | (2009.01) |

(52) U.S. Cl.
CPC ......... *H04L 5/0091* (2013.01); *H04W 52/146* (2013.01); *H04W 52/18* (2013.01); *H04W 52/248* (2013.01); *H04W 52/32* (2013.01); *H04W 52/325* (2013.01); *H04W 52/58* (2013.01); *H04W 72/042* (2013.01); *H04W 72/0453* (2013.01); *H04W 52/34* (2013.01); *H04W 88/02* (2013.01); *H04W 88/08* (2013.01)

(56) References Cited

U.S. PATENT DOCUMENTS

| | | | |
|---|---|---|---|
| 8,233,458 | B2 | 7/2012 | Ahn et al. |
| 8,295,868 | B2 | 10/2012 | Zhang et al. |
| 8,311,053 | B2 | 11/2012 | Choi |
| 8,982,801 | B2 | 3/2015 | Shin et al. |
| 2004/0106426 | A1 | 6/2004 | Koo et al. |
| 2006/0274712 | A1 | 12/2006 | Malladi et al. |
| 2007/0189199 | A1 | 8/2007 | Nishio |
| 2007/0274343 | A1 | 11/2007 | Nishio |
| 2009/0077456 | A1 | 3/2009 | Pi et al. |
| 2009/0088148 | A1 | 4/2009 | Chung et al. |
| 2009/0129259 | A1 | 5/2009 | Malladi et al. |
| 2009/0180433 | A1 | 7/2009 | Ahn et al. |
| 2009/0197630 | A1 | 8/2009 | Ahn |
| 2009/0204863 | A1 | 8/2009 | Kim |
| 2009/0238091 | A1 | 9/2009 | Kim et al. |
| 2009/0245194 | A1 | 10/2009 | Damnjanovic et al. |
| 2009/0300456 | A1 | 12/2009 | Pelletier et al. |
| 2009/0305698 | A1 | 12/2009 | Zhang et al. |
| 2009/0316643 | A1 | 12/2009 | Yamada et al. |
| 2009/0318158 | A1 | 12/2009 | Yamada et al. |
| 2010/0042887 | A1 | 2/2010 | Yamada et al. |
| 2010/0195594 | A1 | 8/2010 | Seo et al. |
| 2010/0215011 | A1 | 8/2010 | Pan et al. |
| 2010/0226327 | A1 | 9/2010 | Zhang et al. |
| 2010/0232373 | A1* | 9/2010 | Nory ................. H04W 72/1289 370/329 |
| 2010/0254329 | A1 | 10/2010 | Pan et al. |
| 2010/0260117 | A1 | 10/2010 | Ojala et al. |
| 2010/0273515 | A1 | 10/2010 | Fabien et al. |
| 2010/0279628 | A1 | 11/2010 | Love |
| 2010/0303039 | A1 | 12/2010 | Zhang et al. |
| 2011/0013581 | A1 | 1/2011 | Lee et al. |
| 2011/0038271 | A1 | 2/2011 | Shin et al. |
| 2011/0038295 | A1 | 2/2011 | Hu et al. |
| 2011/0044222 | A1 | 2/2011 | Gerstenberger et al. |
| 2011/0081939 | A1 | 4/2011 | Damnjanovic et al. |
| 2011/0081940 | A1 | 4/2011 | Gerstenberger et al. |
| 2011/0083066 | A1 | 4/2011 | Chung et al. |
| 2011/0111788 | A1 | 5/2011 | Damnjanovic et al. |
| 2011/0228732 | A1* | 9/2011 | Luo .................. H04L 5/001 370/329 |
| 2011/0243087 | A1 | 10/2011 | Ahn et al. |
| 2011/0250918 | A1 | 10/2011 | Jen |
| 2011/0261768 | A1* | 10/2011 | Luo .................. H04L 5/001 370/329 |
| 2011/0292887 | A1 | 12/2011 | Baldemair et al. |
| 2011/0319121 | A1 | 12/2011 | Jen |
| 2012/0033627 | A1 | 2/2012 | Li et al. |
| 2012/0044906 | A1 | 2/2012 | Chen et al. |
| 2012/0069802 | A1* | 3/2012 | Chen ................. H04L 5/001 370/329 |
| 2012/0082125 | A1 | 4/2012 | Huang |
| 2012/0106569 | A1 | 5/2012 | Che et al. |
| 2012/0207103 | A1* | 8/2012 | Dai .................. H04W 48/08 370/329 |
| 2012/0236812 | A1 | 9/2012 | Chen et al. |
| 2012/0257582 | A1 | 10/2012 | Damnjanovic et al. |
| 2013/0051342 | A1* | 2/2013 | Aiba .................. H04L 1/1893 370/329 |
| 2013/0070692 | A1* | 3/2013 | Miki .................. H04W 72/048 370/329 |
| 2013/0155914 | A1 | 6/2013 | Wang et al. |
| 2013/0182654 | A1 | 7/2013 | Hariharan et al. |
| 2013/0242882 | A1* | 9/2013 | Blankenship ....... H04W 72/042 370/329 |
| 2014/0056244 | A1* | 2/2014 | Frenne ................. H04L 5/0053 370/329 |
| 2014/0126491 | A1 | 5/2014 | Ekpenyong et al. |
| 2014/0128085 | A1* | 5/2014 | Charbit .................. H04L 5/00 455/450 |
| 2015/0305000 | A1* | 10/2015 | Nguyen .................. H04L 5/14 370/329 |

OTHER PUBLICATIONS

3GPP, "Technical Specification Group Radio Access Network; Evolved Universal Terrestrial Radio Access (E-UTRA); Physical layer procedures (Release 8)", 3GPP TS 36.213 V8.6.0 (Mar. 2009), pp. 1-77.
3GPP, "Technical Specification Group Radio Access Network; Further Advancements for E-UTRA; Physical Layer Aspects (Release 9)", 3GPP TR 36.814 V1.0.2 (Mar. 2009), (37 pages).
LG Electronics: "Initial Access Procedure in LTE-Advanced", 3GPP TSG RAN WG1 Meeting #55 R1-084196 (4 pages).
Nokia et al., "DL Control Signalling to Support Extended Bandwidth", 3GPP Draft, 3GPP TSG-RAN WG1 Meeting #57, San Francisco, USA, Apr. 28, 2009, R1-092141, Mobile Competence Centre, 650, Route Des Lucioles, F-06921 Sophia-Antipolis Cedex, France, 7 pages.
Office Action issued in U.S. Appl. No. 13/378,430 dated Jun. 12, 2014.
Panasonic: "DCI format 3/3A for cross carrier operation", 3GPP Draft; R1-102030, (3GPP), Mobile Competence Centre; 650, Route Des Lucioles; F-06921 Sophia-Antipolis Cedex; France, vol. RAN WG1, no. Beijing, China; 20100412, Apr. 6, 2010, XP050419361, 3 pages.
Qualcomm Europe, "Multicarrier Control for LTE-Advanced", 3GPP TSG RAN WG1 #56bis, R1-091460, Mar. 23-27, 2009, Seoul, Korea, pp. 1-6.
Qualcomm, "multicarrier control for LTE-A", 3GPP DRAFT; R1-092060. (3GPP), Mobile Competence Centre; 650, Route Des Lucioles; F-06921 Sophia-Antipolis Cedex; France, vol. RAN WG1, no. San Francisco, USA; May 4, 2009-May 8, 2009, Apr. 28, 2009, XP050597431, pp. 13-14.
Samsung, 3GPP TSG RAN WG1 #57, San Francisco, CA, USA, R1-091880, "UL Transmission Power Control in LTE-A". May 4-8, 2009.

(56) References Cited

OTHER PUBLICATIONS

U.S. Final Office Action issued in U.S. Appl. No. 13/378,430 dated Feb. 14, 2014.
U.S. Office Action dated Dec. 13, 2013 issued in U.S. Appl. No. 13/378,409.
U.S. Office Action dated Dec. 8, 2014 issued in U.S. Appl. No. 13/378,409.
U.S. Office Action dated Jul. 15, 2014 issued in U.S. Appl. No. 13/378,409.
U.S. Office Action for U.S. Appl. No. 14/635,886, dated Jun. 19, 2015.
U.S. Office Action issued in U.S. Appl. No. 13/378,430 dated Aug. 2, 2013.
Advisory Action for U.S. Appl. No. 14/635,886 dated May 31, 2017.
U.S. Corrected Notice of Allowability for U.S. Appl. No. 14/715,219, dated Jul. 31, 2017.
U.S. Notice of Allowance for U.S. Appl. No. 14/715,219, dated Jul. 6, 2017.
U.S. Office Action dated Apr. 7, 2016, for U.S. Appl. No. 14/635,886.
U.S. Office Action dated May 6, 2016, for U.S. Appl. No. 14/635,886.
U.S. Office Action for U.S. Appl. No. 14/635,886 dated Nov. 3, 2016.
U.S. Office Action for U.S. Appl. No. 14/635,886, dated Dec. 16, 2015.
U.S. Office Action for U.S. Appl. No. 14/635,886, dated Mar. 9, 2017.
U.S. Office Action for U.S. Appl. No. 14/635,886, dated Sep. 29, 2017.
U.S. Office Action for U.S. Appl. No. 14/715,219, dated Jan. 27, 2017.
Motorola, "Comparison of PDCCH Structures for Carrier Aggregation," 3GPP TSG RAN1 #56bis, R1-091326, Mar. 23-27, 2009, 5 pages.

* cited by examiner

FIG.6

| MOBILE STATION APPARATUS | ANCHOR DOWNLINK COMPONENT CARRIER | PUCCH/PUSCH | RNTI | NUMBER OF UPLINK CARRIER COMPONENT | NUMBER OF TPC COMMAND | TRANSMISSION POWER OF TPC COMMAND [dBm] |
|---|---|---|---|---|---|---|
| A1 | DCC-2 | TPC-PUCCH-RNTI | 0001 | UCC-1 | 2 | 0 |
|  |  |  |  | UCC-2 | 3 | 4 |
|  |  |  |  | UCC-3 | 4 | -1 |
|  |  | TPC-PUSCH-RNTI | 0002 | UCC-1 | 1 | 0 |
|  |  |  |  | UCC-2 | 2 | 4 |
|  |  |  |  | UCC-3 | 3 | -1 |
| A2 | DCC-3 | TPC-PUCCH-RNTI | 00AB | UCC-1 | 2 | -1 |
|  |  |  |  | UCC-2 | 3 | 4 |
|  |  |  |  | UCC-3 | 4 | -1 |
|  |  | TPC-PUSCH-RNTI | 003C | UCC-1 | 8 | -1 |
|  |  |  |  | UCC-2 | 9 | -1 |
|  |  |  |  | UCC-3 | 10 | -1 |

. . .

| AN | DCC-2 | TPC-PUCCH-RNTI | 0001 | UCC-1 | 15 | 1 |
|---|---|---|---|---|---|---|
|  |  |  |  | UCC-2 | 16 | 4 |
|  |  |  |  | UCC-3 |  |  |
|  |  | TPC-PUSCH-RNTI | 0002 | UCC-1 | 12 | 1 |
|  |  |  |  | UCC-2 | 13 | 1 |
|  |  |  |  | UCC-3 |  |  |

FIG.8

| ANCHOR DOWNLINK COMPONENT CARRIER | PUCCH/PUSCH | RNTI | NUMBER OF UPLINK CARRIER COMPONENT | NUMBER OF TPC COMMAND | TRANSMISSION POWER OF TPC COMMAND [dBm] |
|---|---|---|---|---|---|
| DCC-2 | TPC-PUCCH-RNTI | 0001 | UCC-1 | 2 | 0 |
| | | | UCC-2 | 3 | 4 |
| | | | UCC-3 | 4 | 1 |
| | TPC-PUSCH-RNTI | 0002 | UCC-1 | 1 | 0 |
| | | | UCC-2 | 2 | 4 |
| | | | UCC-3 | 3 | 1 |

FIG.14

| MOBILE STATION APPARATUS | ANCHOR DOWNLINK COMPONENT CARRIER | PUCCH/PUSCH | RNTI | NUMBER OF UPLINK CARRIER COMPONENT | NUMBER OF TPC COMMAND | TRANSMISSION POWER OF TPC COMMAND [dBm] |
|---|---|---|---|---|---|---|
| A1 | DCC-2 | TPC-PUCCH-RNTI | 0001 | UCC-1 | 2 | 0 |
|  |  |  |  | UCC-2 | 3 | 4 |
|  |  | TPC-PUSCH-RNTI | 0002 | UCC-1 | 4 | 0 |
|  |  |  |  | UCC-2 | 1 | 1 |
|  | DCC-3 | TPC-PUCCH-RNTI | 0001 | UCC-3 | 2 | −1 |
|  |  |  |  | UCC-4 | 3 | 1 |
|  |  | TPC-PUSCH-RNTI | 0002 | UCC-3 | 15 | −4 |
|  |  |  |  | UCC-4 | 16 | −1 |
| ... | | | | | | |
| AN | DCC-2 | TPC-PUCCH-RNTI | 0001 | UCC-1 |  |  |
|  |  |  |  | UCC-2 | 16 | 4 |
|  |  | TPC-PUSCH-RNTI | 0002 | UCC-1 | 13 | 1 |
|  |  |  |  | UCC-2 | 7 | 1 |
|  | DCC-4 | TPC-PUCCH-RNTI | 00A4 | UCC-3 | 8 | 4 |
|  |  |  |  | UCC-4 | 7 | −1 |
|  |  | TPC-PUSCH-RNTI | 00BB | UCC-3 |  |  |
|  |  |  |  | UCC-4 | 8 | 1 |

FIG.16

| ANCHOR DOWNLINK COMPONENT CARRIER | PUCCH/PUSCH | RNTI | NUMBER OF UPLINK CARRIER COMPONENT | NUMBER OF TPC COMMAND | TRANSMISSION POWER OF TPC COMMAND [dBm] |
|---|---|---|---|---|---|
| DCC-2 | TPC-PUCCH-RNTI | 0001 | UCC-1 | 2 | 0 |
| | | | UCC-2 | 3 | 4 |
| | TPC-PUSCH-RNTI | 0002 | UCC-1 | 4 | 0 |
| | | | UCC-2 | 1 | 1 |
| DCC-3 | TPC-PUCCH-RNTI | 0001 | UCC-3 | 2 | −1 |
| | | | UCC-4 | 3 | 1 |
| | TPC-PUSCH-RNTI | 0002 | UCC-3 | 15 | −4 |
| | | | UCC-4 | 16 | −1 |

FIG.19

| MOBILE STATION APPARATUS | PUCCH/PUSCH | RNTI | NUMBER OF UPLINK CARRIER COMPONENT | NUMBER OF TPC COMMAND | TRANSMISSION POWER OF TPC COMMAND [dBm] |
|---|---|---|---|---|---|
| A1 | TPC-PUCCH-RNTI | 0001 | UCC-1 | 2 | 0 |
| | | | UCC-2 | 3 | 4 |
| | | | UCC-3 | 4 | 1 |
| | TPC-PUSCH-RNTI | 0002 | UCC-1 | 1 | 0 |
| | | | UCC-2 | 2 | 4 |
| | | | UCC-3 | 3 | 1 |
| A2 | TPC-PUCCH-RNTI | 00AB | UCC-1 | 2 | -1 |
| | | | UCC-2 | 3 | 4 |
| | | | UCC-3 | 4 | -1 |
| | TPC-PUSCH-RNTI | 003C | UCC-1 | 8 | -1 |
| | | | UCC-2 | 9 | 1 |
| | | | UCC-3 | 10 | -1 |
| ... | | | | | |
| AN | TPC-PUCCH-RNTI | 0001 | UCC-1 | 15 | 1 |
| | | | UCC-2 | 16 | 4 |
| | | | UCC-3 | | |
| | TPC-PUSCH-RNTI | 0002 | UCC-1 | 12 | 1 |
| | | | UCC-2 | 13 | 1 |
| | | | UCC-3 | | |

FIG.21

| PUCCH/PUSCH | RNTI | NUMBER OF UPLINK CARRIER COMPONENT | NUMBER OF TPC COMMAND | TRANSMISSION POWER OF TPC COMMAND [dBm] |
|---|---|---|---|---|
| TPC-PUCCH-RNTI | 0001 | UCC-1 | 2 | 0 |
| | | UCC-2 | 3 | 4 |
| | | UCC-3 | 4 | 1 |
| TPC-PUSCH-RNTI | 0002 | UCC-1 | 1 | 0 |
| | | UCC-2 | 2 | 4 |
| | | UCC-3 | 3 | 1 |

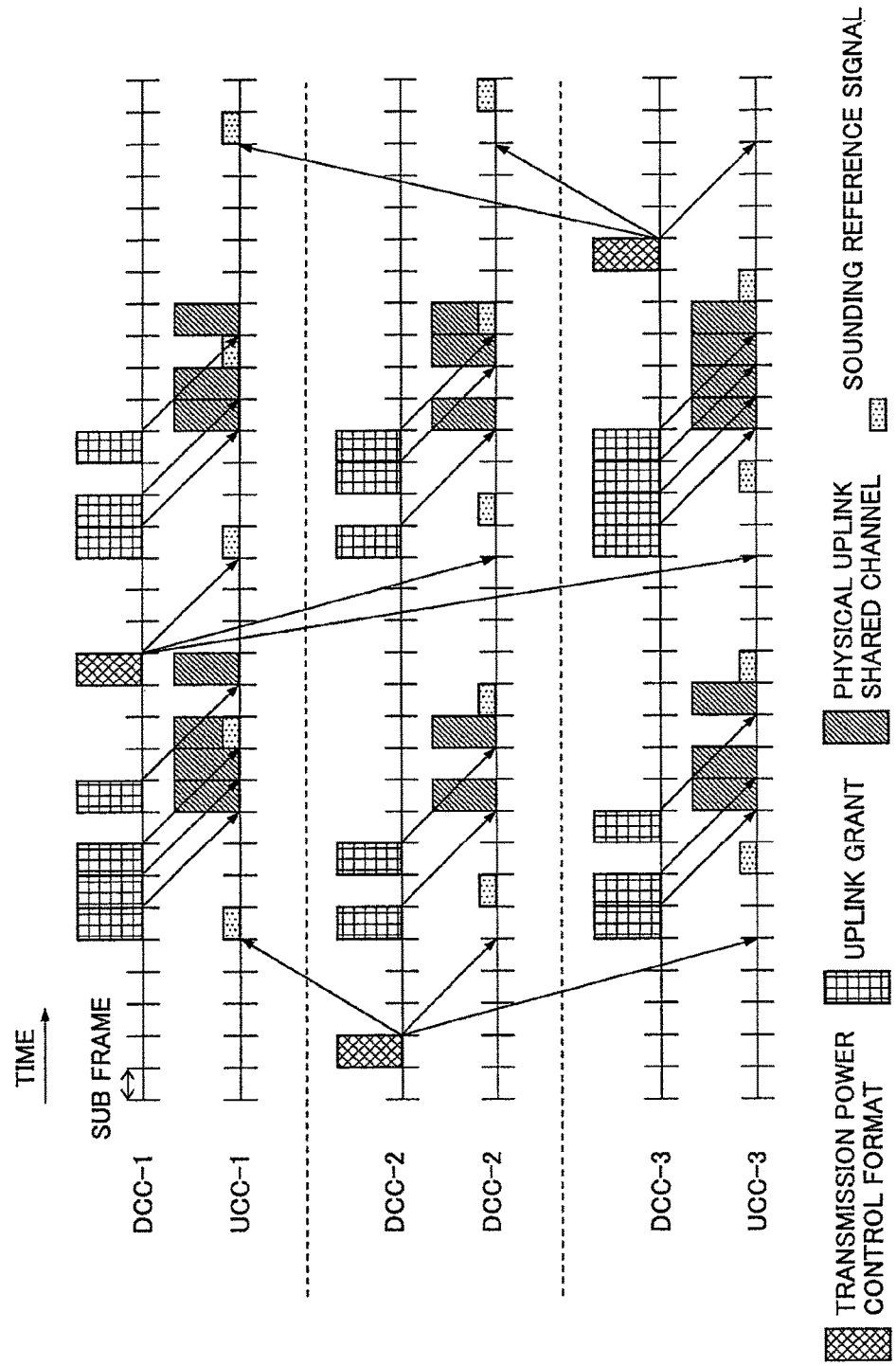

MOBILE STATION APPARATUS, BASE STATION APPARATUS, RADIO COMMUNICATION METHOD AND COMMUNICATION CIRCUIT THAT EXECUTE RADIO COMMUNICATION USING COMPONENT CARRIERS

This application is a Continuation of U.S. application Ser. No. 14/715,219 filed on May 18, 2015, which is a continuation of U.S. application Ser. No. 13/378,409, filed on Dec. 28, 2011, now U.S. Pat. No. 9,072,056 issued on Jun. 30, 2015. Application Ser. No. 13/378,409 is the National Phase of PCT International Application No. PCT/JP2010/058750 filed on May 24, 2010, and claims priority under 35 U.S.C. § 119 (a) to Patent Application No. 2009-142874 filed in Japan on Jun. 16, 2009, all of which are hereby expressly incorporated by reference into the present application.

TECHNICAL FIELD

The present invention relates to a mobile station apparatus, a base station apparatus, a radio communication method, and an integrated circuit.

BACKGROUND ART

In the 3rd generation partnership project (3GPP), evolution of a radio access system and a radio network for the cellular mobile communication (hereinafter, referred to as "Long Term Evolution (LTE)" or "Evolved Universal Terrestrial Radio Access (EUTRA)") and the radio access system and the radio network that realize higher-speed data communication utilizing frequencies in a wider band (hereinafter, referred to as "Long Term Evolution-Advanced (LTE-A)" or "Advanced Evolved Universal Terrestrial Radio Access (A-EUTRA)") are considered.

In LTE, orthogonal frequency division multiplexing (OFDM) system that is a multi-carrier transmission is used as a downlink, and a single-carrier communication system of SC-FDMA (Single-Carrier Frequency-Division Multiple Access) system that is a single-carrier transmission is used as an uplink. In LTE, such channels are allocated to the radio communication from a base station apparatus to a mobile station apparatus (the downlink) as a physical broadcast channel (PBCH), a physical downlink control channel (PDCCH), a physical downlink shared channel (PDSCH), a physical multicast channel (PMCH), a physical control format indicator channel (PCFICH), and a physical HARQ (hybrid automatic repeat request) indicator channel (PHICH).

A physical uplink shared channel (PUSCH), a physical uplink control channel (PUCCH), and a physical random access channel (PRACH) are allocated to the radio communication from the mobile station apparatus to the base station apparatus (the uplink).

In LTE, to control interferences among base stations, to save electric power of the mobile station apparatus, etc., the transmission power of the physical uplink control channel, the physical uplink shared channel, and a sounding reference signal that is transmitted by the mobile station apparatus to measure the quality of the uplink channels is controlled using a plurality of parameters. The parameters for controlling the transmission power include a parameter based on a path loss measured by the mobile station apparatus from a downlink signal and parameters notified of by the base station apparatus to the mobile station apparatus. The parameters notified of by the base station apparatus to the mobile station apparatus include a parameter commonly set among mobile station apparatuses and a parameter set in each of the mobile station apparatus. A "TPC command (Transmission Power Control command)" is transmitted in the physical downlink control channel, that is a parameter for each of the mobile station apparatuses and that is notified of by the base station apparatus to the mobile station apparatus (see Chapter V of Non-Patent Literature 1).

Section 5.3.3 of Non-Patent Literature 2 describes a format of downlink control information that is transmitted in the physical downlink control channel. A format indicating the allocation of radio resources of the physical uplink shared channel includes a TPC command for the physical uplink shared channel and the sounding reference signal. Hereinafter, this format will be referred to as "uplink grant". A format indicating the allocation of radio resources of the physical downlink shared channel includes a TPC command for the physical uplink control channel. Hereinafter, this format will be referred to as "downlink grant" or "downlink assignment".

A "format 3" and a "format 3A" are defined, that include only a plurality of TPC commands for a plurality of mobile station apparatuses. For the format 3 and the format 3A, the number of bits of the TPC commands included in each format differs from that of each other. Hereinafter, the format 3 and the format 3A will be collectively referred to as "format 3/3A". The base station apparatus notifies the mobile station apparatus of an identifier and one number. The mobile station apparatus recognizes a TPC command of the number notified of from the base station apparatus that is included in the format 3/3A that includes the identifier notified of from the base station apparatus as a TPC command addressed to the mobile station apparatus. To identify whether the TPC command included in the format 3/3A is for the physical uplink control channel or for the physical uplink shared channel and the sounding reference signal, the base station apparatus allocates two identifiers and allocates one number to each of these identifiers. The identifier corresponding to the physical uplink control channel is referred to as "TPC-PUCCH-RNTI (Transmission Power Control-Physical Uplink Control Channel-Radio Network Temporary Identifier)" and the identifier corresponding to the physical uplink shared channel and the sounding reference signal is referred to as "TPC-PUSCH-RNTI (Transmission Power Control-Physical Shared Control Channel-Radio Network Temporary Identifier)".

A plurality of mobile station apparatuses need to receive the format 3/3A and, therefore, the format 3/3A is located in a common search space for all of the mobile station apparatuses to search the physical downlink control channel and are not located in a user equipment-specific search space that has a physical downlink control channel addressed to a specific mobile station apparatus disposed therein. The format 3/3A is used for the base station apparatus to transmit the TPC command to control the transmission power of a signal in the uplink of the mobile station apparatus, when, for example, the base station apparatus allocates no radio resources to the mobile station apparatus in the physical uplink shared channel using the uplink grant and in the physical downlink shared channel using the downlink grant and the mobile station apparatus regularly transmits the physical uplink shared channel, and the the sounding reference signal and physical uplink control channel for the physical downlink shared channel.

It is required to LTE-A that LTE-A has the compatibility with LTE, that is, that a base station apparatus based on LTE-A is enabled to simultaneously execute radio communication with both of a mobile station apparatus based on LTE-A and that based on LTE, and a mobile station apparatus based on LTE-A is enabled to execute radio communication with both of a base station apparatus based on LTE-A and that based on LTE. Therefore, using the same channel structure as that of LTE is considered for LTE-A.

For example, a technique is proposed for LTE-A of using a plurality of frequency bands each having the same channel structure as that of LTE (hereinafter, referred to as "carrier component (CC)" or "component carrier (CC)") as one frequency band (a wideband frequency band) ("frequency band aggregation", also referred to as "spectrum aggregation", "carrier aggregation", "frequency aggregation", etc.).

More specifically, in communication using the frequency band aggregation, the physical broadcast channel, the physical downlink control channel, the physical downlink shared channel, the physical multicast channel, the physical control format indicator channel, and the HARQ indicator channel are transmitted for each downlink carrier component, and the physical uplink shared channel, the physical uplink control channel, and the physical random access channel are allocated to each uplink carrier component. The frequency band aggregation is a technique that a base station apparatus and a plurality of mobile station apparatuses simultaneously transmit and receive pieces of data and pieces of control information using a plurality of carrier components such as the physical uplink control channel, the physical uplink shared channel, the physical downlink control channel, and the physical downlink shared channel in the uplink and the downlink (see Chapter V of Non-Patent Literature 3).

PRIOR ART DOCUMENTS

Non-Patent Literatures

Non-Patent Literature 1: "3GPP TS36.213 v8.6.0 (2009-03)", Mar. 17, 2009
Non-Patent Literature 2: "3GPP TS36.212 v8.6.0 (2009-03)", Mar. 17, 2009
Non-Patent Literature 3: "3GPP TR36.814 v1.0.2 (2009-03)", May, 2009

DISCLOSURE OF THE INVENTION

Problems that the Invention is to Solve

However, according to the conventional techniques, a problem arises that no method is disclosed for allocating a plurality of uplink carrier components to the mobile station apparatus and efficiently controlling the transmission power of each channel of the uplink carrier components allocated. More specifically, according to the conventional techniques, it has not been able to indicate that the TPC command for the physical uplink control channel included in the downlink grant is as a TPC command for the physical uplink control channel of which uplink carrier component. Thereby, another problem arises that the mobile station apparatus applies the TPC command for the physical uplink control channel included in the downlink grant to an uplink carrier component for which no radio resource of the physical uplink control channel is allocated to the base station apparatus and, therefore, the TPC command included in the downlink grant is wasted.

The present invention was conceived in view of the above circumstances and the object thereof is to provide a mobile station apparatus, a base station apparatus, a radio communication method, and an integrated circuit that are able to allocate a plurality of uplink carrier components to the mobile station apparatus and efficiently control the transmission power of the uplink carrier components allocated.

Means to Solve the Problems (1) To accomplish the above purpose, the present invention is a base station apparatus that executes radio communication with a mobile station apparatus using a plurality of component carriers, wherein the base station apparatus transmits to the mobile station apparatus downlink control information that includes information indicating allocation of radio resources to a physical downlink shared channel allocated in any one downlink component carrier, and a TPC command for a physical uplink control channel of an uplink component carrier to transmit ACK/NACK for the physical downlink shared channel.

(2) Further, the present invention is a mobile station apparatus that executes radio communication with a base station apparatus using a plurality of component carriers, wherein the mobile station apparatus receives from the base station apparatus downlink control information that includes information indicating allocation of radio resources to a physical downlink shared channel allocated in any one downlink component carrier, and a TPC command for a physical uplink control channel of an uplink component carrier to transmit ACK/NACK for the physical downlink shared channel.

(3) Further, the present invention is a radio communication method by a base station apparatus that executes radio communication with a mobile station apparatus using a plurality of component carriers, wherein the base station apparatus transmits to the mobile station apparatus downlink control information that includes information indicating allocation of radio resources to a physical downlink shared channel allocated in any one downlink component carrier, and a TPC command for a physical uplink control channel of an uplink component carrier to transmit ACK/NACK for the physical downlink shared channel.

(4) Further, the present invention is a radio communication method by a mobile station apparatus that executes radio communication with a base station apparatus using a plurality of component carriers, wherein the mobile station apparatus receives from the base station apparatus downlink control information that includes information indicating allocation of radio resources to a physical downlink shared channel allocated in any one downlink component carrier, and a TPC command for a physical uplink control channel of an uplink component carrier to transmit ACK/NACK for the physical downlink shared channel.

(5) Further, the present invention is an integrated circuit installed in a base station apparatus that executes radio communication with a mobile station apparatus using a plurality of component carriers, wherein the base station apparatus transmits to the mobile station apparatus downlink control information that includes information indicating allocation of radio resources to a physical downlink shared channel allocated in any one downlink component carrier, and a TPC command for a physical uplink control channel of an uplink component carrier to transmit ACK/NACK for the physical downlink shared channel.

(6) Further, the present invention is an integrated circuit installed in a mobile station apparatus that executes radio communication with a base station apparatus using a plurality of component carriers, wherein the mobile station apparatus receives from the base station apparatus downlink control information that includes information indicating allocation of radio resources to a physical downlink shared channel allocated in any one downlink component carrier, and a TPC command for a physical uplink control channel of an uplink component carrier to transmit ACK/NACK for the physical downlink shared channel.

Effect of the Invention

According to the present invention, the base station apparatus is able to efficiently execute the transmission power control for the physical uplink control channel of the plurality of uplink carrier components allocated to the mobile station apparatus.

More specifically, according to the present invention, the base station apparatus includes in the downlink control information (the downlink grant) the TPC command for the physical uplink control channel of the uplink carrier component to transmit the uplink control information (ACK/NACK) for the physical downlink shared channel whose allocation of the radio resources is indicated by the downlink control information, and transmits the downlink control information to the mobile station apparatus. Thereby, the base station apparatus is able to allocate the radio resources for the physical downlink shared channel using the same downlink control information (downlink grant) and control the transmission power of the physical uplink control channel of the uplink carrier component to transmit ACK/NACK for this physical downlink shared channel. The base station apparatus is able to efficiently execute the transmission power control for the physical uplink control channel of the plurality of uplink carrier components allocated to the mobile station apparatus.

BRIEF DESCRIPTION OF DRAWINGS

FIG. 6 is a diagram of an example of various kinds of setting information stored in a storing portion b113 according to the embodiment.

FIG. 8 is a diagram of an example of various kinds of setting information stored in a storing portion a113 according to the embodiment.

FIG. 14 is a diagram of an example of various kinds of setting information stored by a storing portion b213 according to the reference example.

FIG. 16 is a diagram of an example of various kinds of setting information stored by a storing portion a213 according to the reference example.

FIG. 19 is a diagram of an example of various kinds of setting information stored by a storing portion b313 according to the reference example.

FIG. 21 is a diagram of an example of various kinds of setting information stored by a storing portion a313 according to the reference example.

FIG. 22 is a diagram of a method of applying a TPC command to a physical uplink shared channel of the mobile station apparatus a3 according to the reference example.

EMBODIMENT OF THE INVENTION

An embodiment of the present invention will now be described in detail with reference to the accompanying drawings.

<About Radio Communication System>

Figure 1:
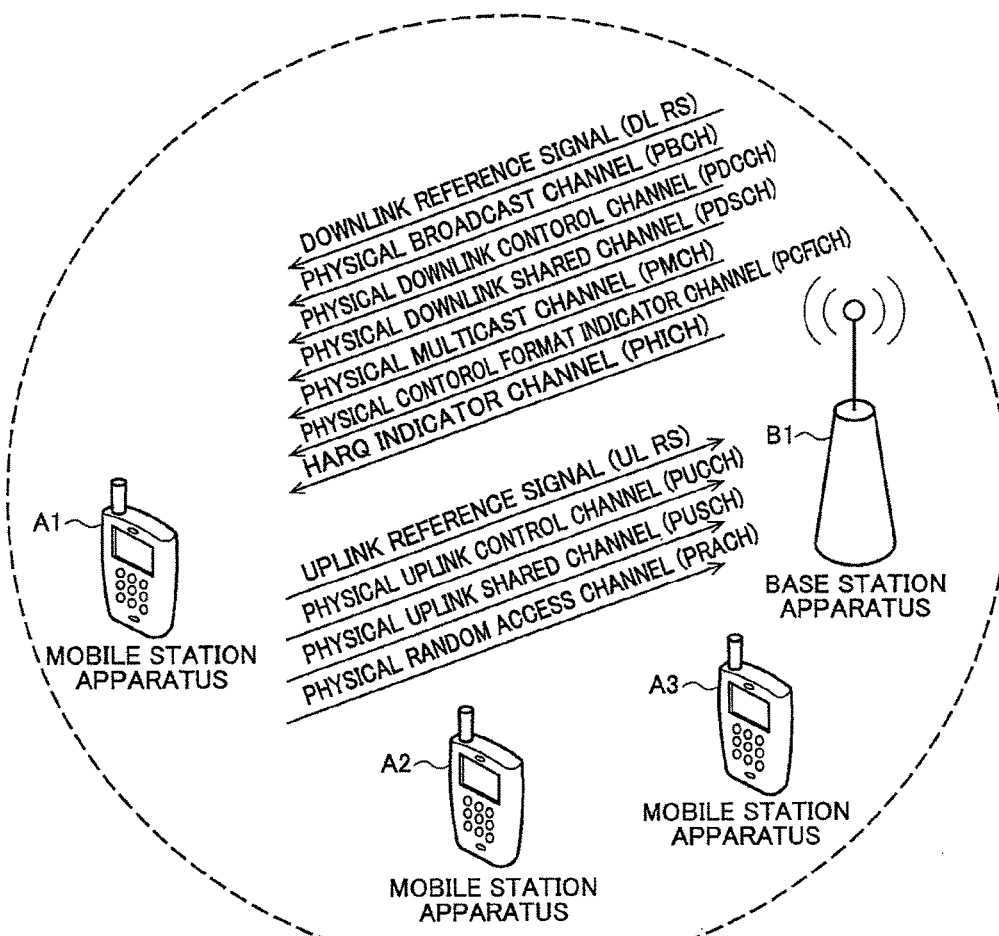
FIG. 1 is a conceptual diagram of a radio communication system according to an embodiment of the present invention.

FIG. 1 is a conceptual diagram of a radio communication system according to a first embodiment of the present invention. In FIG. 1, the radio communication system includes mobile station apparatuses A1 to A3 and a base station apparatus B1. The mobile station apparatuses A1 to A3 and the base station apparatus B1 execute communication using frequency band aggregation described later.

FIG. 1 depicts such channels allocated to radio communication from the base station apparatus B1 to the mobile station apparatuses A1 to A3 (downlink) as a downlink pilot channel (or also referred to as "downlink reference signal (DL RS)"), a physical broadcast channel (PBCH), a physical downlink control channel (PDCCH), a physical downlink shared channel (PDSCH), a physical multicast channel (PMCH), a physical control format indicator channel (PCFICH), and a physical hybrid ARQ indicator channel (PHICH).

FIG. 1 depicts such channels allocated to radio communication from the mobile station apparatuses A1 to A3 to the base station apparatus B1 (uplink) as an uplink pilot channel (or also referred to as "uplink reference signal (UL RS)"), a physical uplink control channel (PUCCH), a physical uplink shared channel (PUSCH), and a physical random access channel (PRACH). Uplink reference signals include, a demodulation reference signal that is transmitted being time-multiplexed with the physical uplink shared channel or the physical uplink control channel, and is used to compensate the propagation path for the physical uplink shared channel and the physical uplink control channel, and a sounding reference signal that is used to estimate the state of the propagation path for the uplink.

Hereinafter, the mobile station apparatuses A1 to A3 will be referred to as "mobile station apparatus a1" and the base station apparatus B1 will be referred to as "base station apparatus b1".

<About Frequency Band Aggregation>

Figure 2:
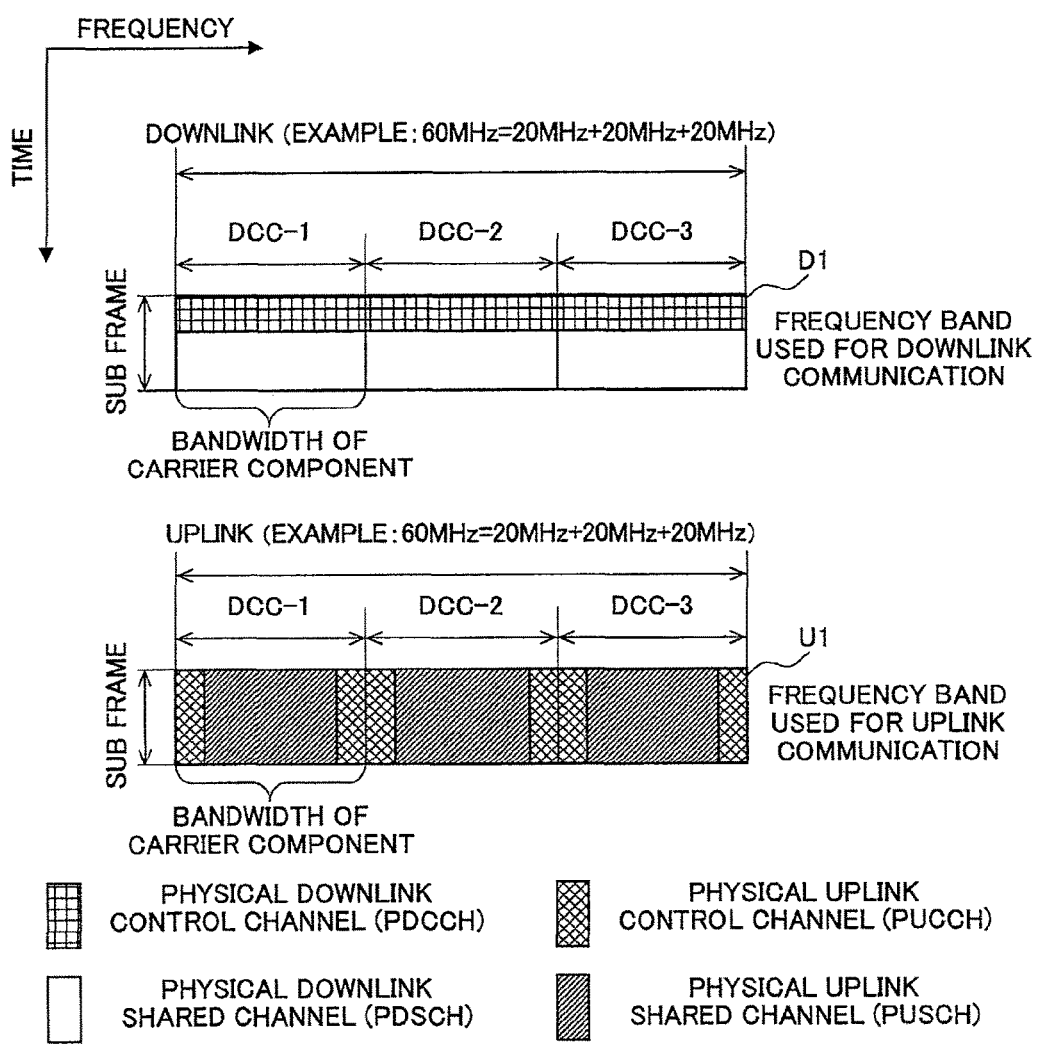
FIG. 2 is a diagram of an example of a frequency band aggregating process according to the embodiment.

FIG. 2 is a diagram of an example of a frequency band aggregating process according to the embodiment. In FIG. 2, the axis of abscissa represents the frequency region and the axis of ordinate represents the time region.

As depicted in FIG. 2, a downlink sub frame D1 includes three sub frames of three carrier components (DCC-1 (Downlink Component Carrier-1), DCC-2, and DCC-3) each having a bandwidth of 20 MHz. The physical downlink control channel represented by an area hatched with grid lines and the physical downlink shared channel represented by an area without any hatching are time-multiplexed and allocated to each of the sub frames of the downlink carrier components (hereinafter, referred to as "downlink carrier components").

On the other hand, an uplink sub frame U1 includes three carrier components (UCC-1 (Uplink Component Carrier-1), UCC-2, and UCC-3) each having a bandwidth of 20 MHz. The physical uplink control channel represented by an area hatched with diagonal grid lines and the physical uplink shared channel represented by an area hatched with lines slant to the left are frequency-multiplexed and allocated to each of the sub frames of the uplink carrier components (hereinafter, referred to as "uplink carrier components").

For example, the base station apparatus b1 locates a signal in the physical downlink shared channel of one or each of a plurality of downlink carrier component(s) of the three downlink carrier components in a downlink sub frame, and transmits the signal(s) to the mobile station apparatus a1. The mobile station apparatus a1 locates a signal in the physical uplink shared channel of one or each of a plurality of uplink carrier component(s) of the three uplink carrier components in an uplink sub frame, and transmits the signal(s) to the base station apparatus b1.

<About Downlink Radio Frame>

Figure 3:
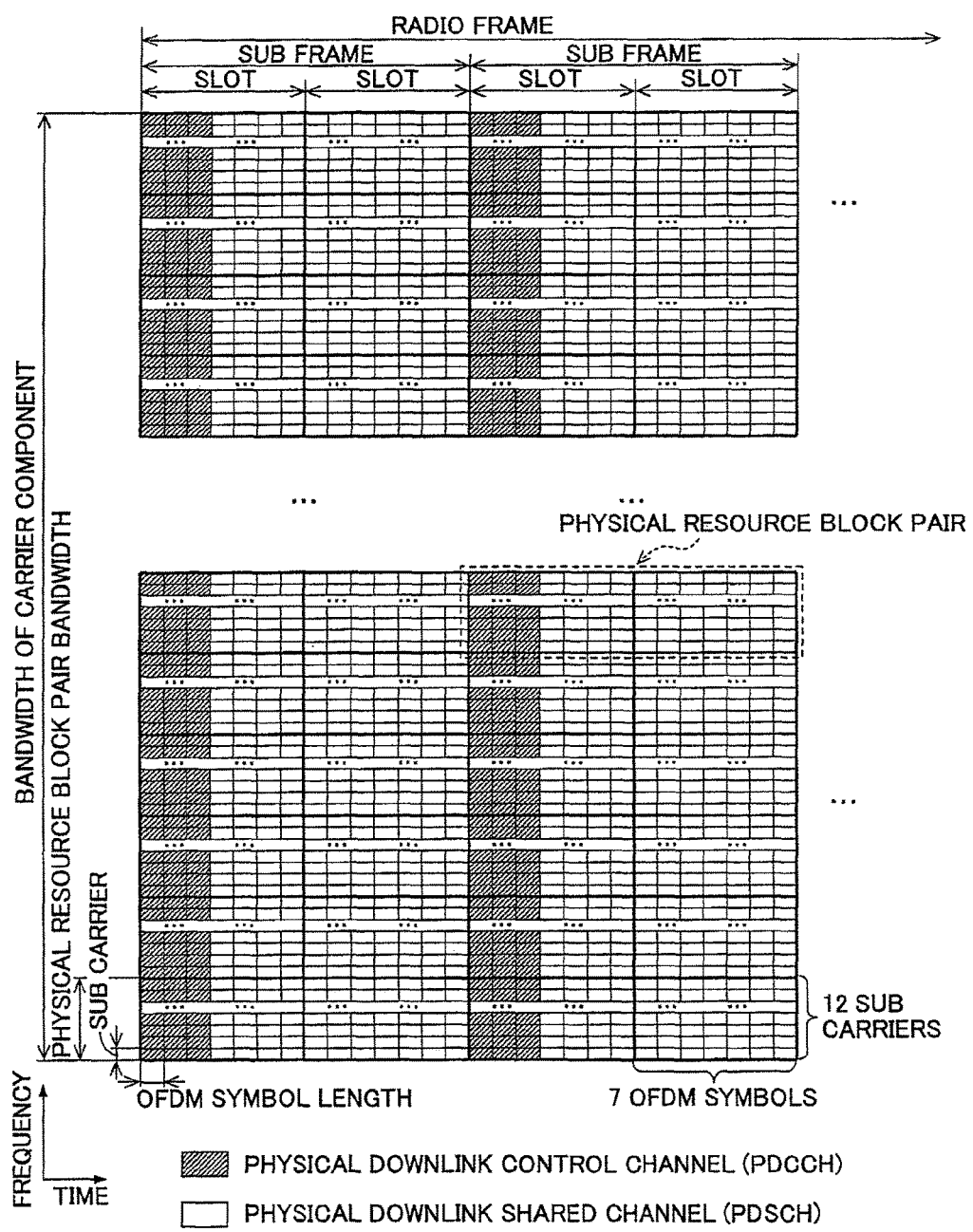
FIG. 3 is a schematic diagram of an example of the configuration of a downlink radio frame according to the embodiment.

FIG. 3 is a schematic diagram of an example of the configuration of a downlink radio frame according to the embodiment. FIG. 3 depicts the configuration of the radio frame of a downlink carrier component. In FIG. 3, the axis of abscissa represents the time region and the axis of ordinate represents the frequency region.

As depicted in FIG. 3, the radio frame of the downlink carrier component includes a plurality of downlink physical resource block (PRB) pairs (for example, an area surrounded by a dotted line of FIG. 3). A "downlink physical resource block pair" is a unit for radio resource allocation, etc., and includes a frequency band having a width determined in advance (a PRB bandwidth) and a time slot (two slots=one sub frame).

One downlink physical resource block pair includes two downlink physical resource blocks (PRB bandwidth×slot) that are sequential in the time region. One downlink physical resource block (a unit surrounded by a thick line in FIG. 3) includes 12 sub carriers in the frequency region and includes seven OFDM symbols in the time region.

In the time region, a slot comprised of seven OFDM symbols, sub frame comprised of two slots, and radio frame comprised of 10 sub frames are present. In the frequency region, a plurality of downlink physical resource blocks (PRBs) are located corresponding to the bandwidth of a downlink carrier component. A unit including one sub carrier and one OFDM symbol is referred to as "downlink resource element (RE)".

Channels allocated in a downlink radio frame will hereinafter be described.

In each downlink sub frame, for example, the physical downlink control channel, the physical downlink shared channel, and the downlink reference signal are allocated. The physical downlink control channel is allocated from an OFDM symbol at the head of a sub frame, the physical downlink shared channel is allocated in the rest of the OFDM symbols in the sub frame. The downlink pilot channel is not depicted in FIG. 3 to simplify the description. However, the downlink pilot channel is allocated being diffused in the frequency region and the time region.

Signals disposed in the physical downlink control channel will be described.

In the physical downlink control channel, a signal is allocated, of downlink control information (DCI) that includes information formats such as a downlink grant, an uplink grant, and a transmission power control format (an information format of the physical control channel for the transmission power control) and that is used to control the communication.

The downlink grant includes, information indicating the modulation scheme for the physical downlink shared channel, information indicating a coding scheme for the physical downlink shared channel, information indicating the allocation of the radio resources for the physical downlink shared channel, information on HARQ (Hybrid Automatic Repeat Request) for the physical downlink shared channel, a TPC command (Transmission Power Control command) for the physical uplink control channel of an uplink carrier component to transmit ACK (ACKnowledgement; a positive response)/NACK (Negative-ACKnowledgement; a negative response) for the physical downlink shared channel with which the downlink grant indicates the allocation of the radio resources and the like. The uplink grant includes information indicating the modulation scheme for the physical uplink shared channel, information indicating the coding scheme for the physical uplink shared channel, information indicating the allocation of the radio resources for the physical uplink shared channel, information on HARQ for the physical uplink shared channel and a TPC command for the physical uplink shared channel with which the uplink grant indicates the allocation of the radio resources and for the sounding reference signal of the same uplink carrier component as that of the physical uplink shared channel and the like.

"HARQ", for example, is a technique which the base station apparatus b1 (the mobile station apparatus a1) retransmits the signal and the mobile station apparatus a1 (the base station apparatus b1) executes a decoding processing for a synthesized signal obtained by combining the signal again received with the signal already received, when the mobile station apparatus a1 (the base station apparatus b1) transmits success or failure (ACK/NACK) of decoding of data information to the base station apparatus b1 (the mobile station apparatus a1) and the mobile station apparatus a1 (the base station apparatus b1) is unable to decode the data information due to an error (NACK).

The transmission power control format is comprised of TPC commands for the physical uplink shared channel or the physical uplink control channel of each of the uplink carrier components for the plurality of mobile station apparatuses a1. The number of bits of one TPC command included in the transmission power control format is same for all of the TPC commands included in the transmission power control format, the transmission power control format does not simultaneously include the TPC command for the physical uplink shared channel and that for the physical uplink control channel. The base station apparatus b1 selects the number of bits of one TPC command included in the transmission power control format and notifies the mobile station apparatus a1 of the number of bits selected.

The downlink grant, the uplink grant, and the TPC command received in the transmission power control format are applied after a predetermined time period elapses. In the embodiment, every time a TPC command is received, only the TPC command just received is applied to the transmission power control. However, an accumulated value of the values of the TPC commands received so far may be applied thereto.

The downlink control information is added with a sequence acquired by performing an exclusive OR operation a cyclic redundancy check (CRC) code produced from a bit sequence of the downlink control information and an identifier. The mobile station apparatus a1 is able to acquire the cyclic redundancy check code by further performing an exclusive OR operation using the identifier allocated with the sequence. The mobile station apparatus a1 is able to determine whether the physical downlink control channel is addressed to the mobile station apparatus a1 based on the identifier included in this physical downlink control channel.

Each of the downlink grant and the uplink grant transmitted to a specific mobile station apparatus a1 includes a C-RNTI (Cell-Radio Network Temporary Identifier) that is an identifier allocated to each mobile station apparatus a1 by the base station apparatus b1. The transmission power control format includes a TPC-PUCCH-RNTI (Transmission Power Control-Physical Uplink Control Channel-Radio Network Temporary Identifier) or a TPC-PUSCH-RNTI (Transmission Power Control-Physical Uplink Shared Channel-Radio Network Temporary Identifier) that is an identifier allocated by the base station apparatus b1 to the plurality of mobile station apparatuses a1. The mobile station apparatus a1 determines whether the TPC command included in the transmission power control format is for the physical uplink control channel or for the physical uplink shared channel and the sounding reference signal by estimating which one of the TPC-PUCCH-RNTI and the TPC-PUSCH-RNTI is included in the transmission power control format.

A signal allocated in the physical downlink shared channel will be described.

A signal of data information (transport block) (hereinafter, referred to as "data signal") is allocated in the physical downlink shared channel. The radio resources in the physical downlink shared channel are allocated using a downlink grant and are allocated in the same downlink sub frame as that of the physical downlink control channel that includes this downlink grant. In the embodiment, the physical downlink control channel and the physical downlink shared channel whose allocation of the radio resources is indicated by the physical downlink control channel are allocated in the same downlink carrier component. However, the present invention does not limit to the above, and the downlink carrier component to be allocated with the physical downlink shared channel may be identified from the downlink grant and the physical downlink control channel and the physical downlink shared channel whose allocation of the radio resources is indicated by the physical downlink control channel may be allocated in different downlink carrier components.

The radio resources allocated with the physical downlink control channel will be described.

The physical downlink control channel is allocated in one or each of more control channel element(s) (CCE(s)). A control channel element is composed of a plurality of resource element groups (REGs or also referred to as "mini-CCEs") scattered in the frequency-time region in the downlink carrier component. A resource element group is composed of four downlink resource elements that are sequential in the frequency region, except the downlink reference signal, in the same OFDM symbol of the same downlink carrier component. For example, the physical downlink control channel is allocated in one or each of two, four, or eight control channel element(s) whose numbers identifying the control channel elements are sequential.

Common search space composed of the control channel elements determined in advance and, a user equipment-specific search space composed of same or different control channel elements as each mobile station apparatus a1 is configured for each downlink carrier component. As to the common search space and the user equipment-specific search space, a different common search space and a different user equipment-specific search space are configured for each of the numbers of the control channel elements that each are allocated with the physical downlink control channel. When the physical downlink control channels are allocated in one, two, four, and eight control channel elements, four user equipment-specific search spaces are configured. The different common search spaces and the different user equipment-specific search spaces may be configured using the same control channel elements.

Such channels are allocated in the common search space as: the physical downlink control channel including information addressed to the plurality of mobile station apparatuses a1 such as the transmission power control format; and the physical downlink control channel including information such as the downlink grant and the uplink grant addressed to the specific mobile station apparatus a1. Such channel is allocated in the user equipment-specific search space as the physical downlink control channel that includes information such as the downlink grant and the uplink grant addressed to the mobile station apparatus a1 monitoring the user equipment-specific search space. The base station apparatus b1 sets a downlink carrier component to monitor and check the physical downlink control channel in the common search space for each of the mobile station apparatuses a1, and notifies the mobile station apparatus a1 of the downlink carrier component that is set. Hereinafter, the downlink carrier component to monitor and check the common search space set for each of the mobile station apparatuses a1 will be referred to as "anchor downlink component carrier".

<About Uplink Radio Frame>

Figure 4:
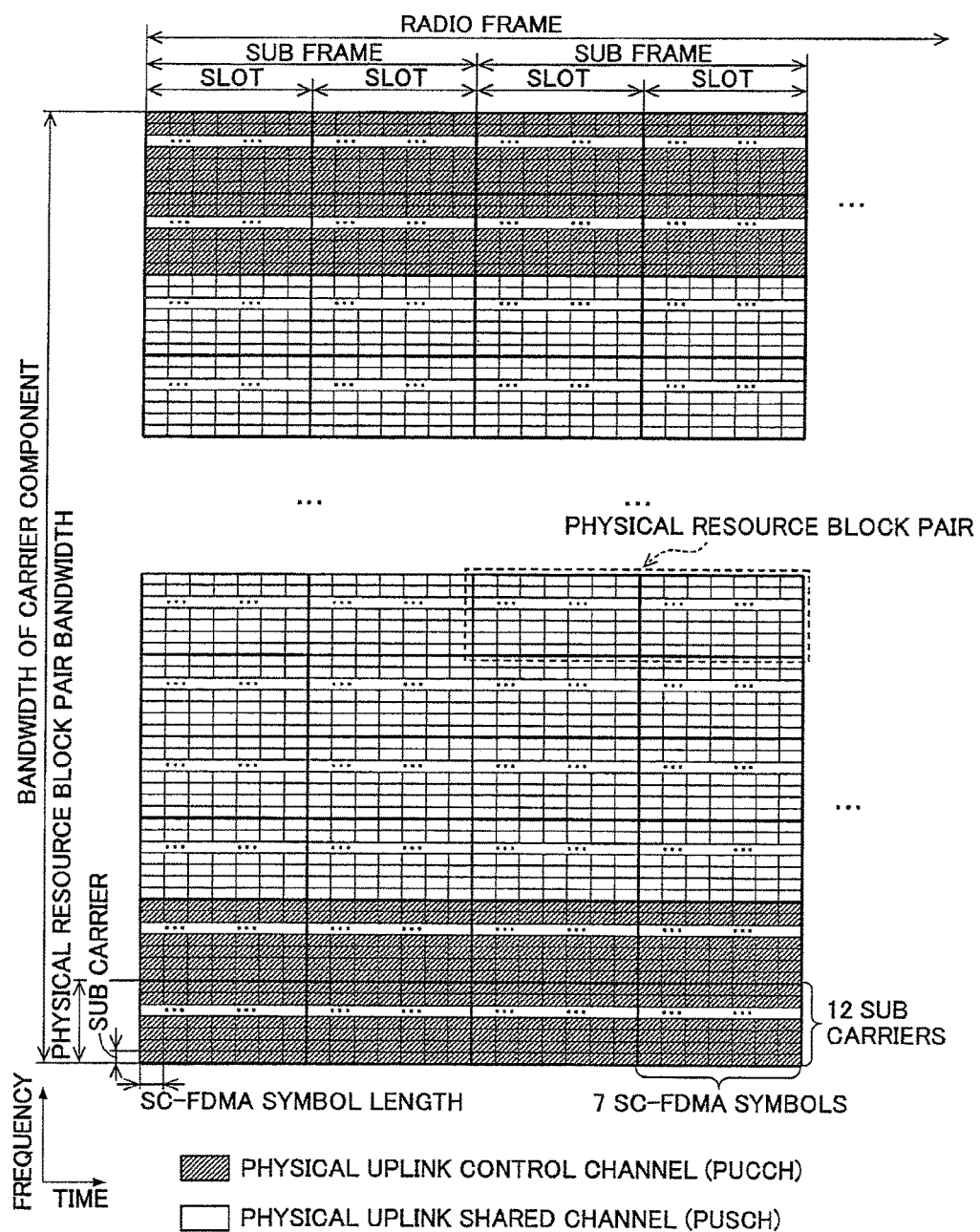
FIG. 4 is a schematic diagram of an example of the configuration of an uplink radio frame according to the embodiment.

FIG. 4 is a schematic diagram of an example of the configuration of a radio frame in the uplink according to the embodiment. FIG. 4 depicts the configuration of the radio frame in an uplink carrier component. In FIG. 4, the axis of abscissa represents the time region and the axis of ordinate represents the frequency region.

As depicted in FIG. 4, the radio frame of the uplink carrier component is composed of a plurality of uplink physical resource block (PRB) pairs (for example, an area surrounded by a dotted line of FIG. 4). An uplink physical resource block pair is a unit for allocation of the radio resources, etc., and is composed of a frequency band having a width determined in advance (a PRB bandwidth) and a time band (two slots=one sub frame).

One uplink physical resource block pair is composed of two uplink physical resource blocks (the PRB bandwidth× slot) that are sequential in the time region. One uplink physical resource block (a unit surrounded by a thick line in FIG. 4) is composed of 12 sub carriers in the frequency region and is composed of seven SC-FDMA symbols in the time region.

In the time region, slots each is composed of seven SC-FDMA symbols, sub frames each including two slots, and a radio frame is composed of 10 sub frames are present. In the frequency region, a plurality of uplink physical resource blocks (PRBs) are allocated corresponding to the bandwidth of the uplink carrier component. A unit is composed of one sub carrier and one SC-FDMA symbol is referred to as "uplink resource element (RE).

The channels allocated in the uplink radio frame will hereinafter be described.

For example, the physical uplink control channel, the physical uplink shared channel, and the uplink reference signal are allocated to each of the uplink sub frames.

The physical uplink control channel is allocated to uplink physical resource block pairs at both ends of the bandwidth of the uplink carrier component (areas hatched with lines slant to the left). The physical uplink control channel is diffused by a spread code in the frequency region and the time region and is code-multiplexed.

The physical uplink shared channel is allocated to the uplink physical resource block pairs other than those for the physical uplink control channel (areas without hatching). The mobile station apparatus a1 does not allocate signal in both of the physical uplink control channel and the physical uplink shared channel in one uplink sub frame.

The demodulation reference signal (not depicted) is allocated being time-multiplexed, to the physical uplink shared channel and the physical uplink control channel. In the time region, the sounding reference signal is allocated in the last SC-FDMA symbol of a sub frame at cycles set by the base station apparatus b1 for each of the mobile station apparatuses a1. In the frequency region, the sounding reference signal is allocated in a frequency region set by the base station apparatus b1 for each of the mobile station apparatuses a1.

Signals allocated in the physical uplink control channel will be described.

Such signals are allocated in the physical uplink control channel as signals of uplink control information (UCI) that is information used for control of the communication such as channel quality information, and a scheduling request (SR) and ACK/NACK.

The channel quality information is the information that indicates the transmission quality of the downlink channels measured by the mobile station apparatus a1 using the downlink reference signal. The scheduling request is the information that is transmitted by the mobile station apparatus a1 when the mobile station apparatus a1 requests the base station apparatus b1 to allocate the radio resources for the uplink. ACK/NACK is the information that indicates success or failure of decoding of the physical downlink shared channel received by the mobile station apparatus a1.

The base station apparatus b1 cyclically allocates the radio resources of the physical uplink control channel to transmit the channel quality information and the scheduling request to each of the mobile station apparatuses a1. The radio resources of the physical uplink control channel to transmit ACK/NACK are radio resources of the physical uplink control channel that corresponds to the control channel elements allocated with the downlink grant indicating the allocation of the radio resources of the physical downlink shared channel that ACK/NACK corresponds to in the frequency region and, in the time region, the radio resources are used after a predetermined time period elapses since the physical downlink shared channel is received. In the embodiment, the radio resources of ACK/NACK of the same uplink carrier component are correlated with the radio resources of the physical downlink control channel of the same downlink carrier component. The TPC command for the physical uplink control channel included in the downlink grant is for the uplink carrier component disposed with the radio resources of ACK/NACK that the downlink grant corresponds to.

A signal allocated in the physical uplink shared channel will be described next.

The signal (referred to as "data signal") of data information (transport block) that is the information other than the uplink control information is allocated in the physical uplink shared channel. The radio resources of the physical uplink shared channel are allocated using the uplink grant and are allocated in a sub frame after a predetermined time period elapses since the sub frame receives the uplink grant. In the embodiment, the mobile station apparatus a1 determines the uplink carrier component allocated with the physical uplink shared channel whose allocation of the radio resources is indicated by the uplink grant, from the downlink carrier component that receives the uplink grant. The TPC command for the physical uplink shared channel and the sounding reference signal included in the uplink grant is for the uplink carrier component allocated with the physical uplink shared channel which the uplink grant corresponds to. However, the present invention does not limit to the above, and the uplink carrier component allocated with the physical uplink shared channel may be identified based on the uplink grant.

<About Configuration of Base Station Apparatus b1>

Figure 5:
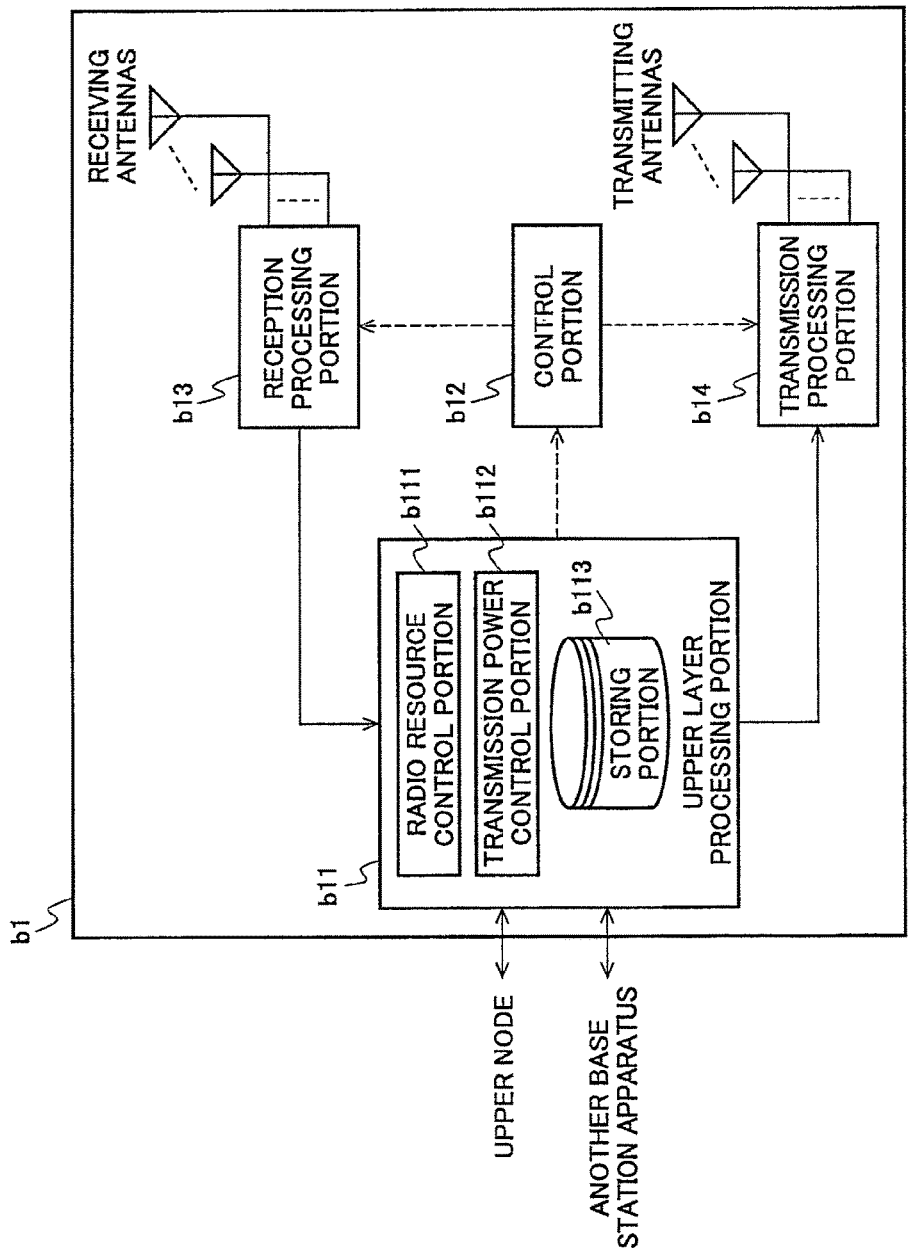
FIG. 5 is a schematic block diagram of the configuration of a base station apparatus b1 according to the embodiment.

FIG. 5 is a schematic block diagram of the configuration of the base station apparatus b1 according to the embodiment. As depicted, the base station apparatus b1 includes an upper layer processing portion b11, a control portion b12, a reception processing portion b13, a plurality of receiving antennas, a transmission processing portion b14, and a plurality of transmitting antennas. The upper layer processing portion b11 includes a radio resource control portion b111, a transmission power control portion b112, and a storing portion b113. Though the receiving antennas and the transmitting antennas are separately configured in FIG. 5, the antennas may be adapted to be commonly used by using a thyristor, etc., that achieves an action of switching signals between inputting and outputting.

The upper layer processing portion b11 outputs to the transmission processing portion b14 the data information for each downlink carrier component acquired from the upper node, etc. The upper layer processing portion b11 also executes processes for a packet data convergence protocol (PDCP) layer, a radio link control (RLC) layer, and a radio resource control (RRC) layer. The radio resource control portion b111 of the upper layer processing portion b11 executes management of various kinds of setting information, the communication state, the buffer state, etc., of each of the mobile station apparatuses a1. The transmission power control portion b112 of the upper layer processing portion b11 executes management of the transmission power of the uplink of each of the mobile station apparatuses a1. The storing portion b113 of the upper layer processing portion b11 has the various kinds of setting information stored therein for each of the mobile station apparatuses a1 set by the radio resource control portion b111 and the transmission power control portion b112.

In the above processes, the radio resource control portion b111 included in the upper layer processing portion b11 allocates a plurality of uplink carrier components and a plurality of downlink carrier components to the mobile station apparatus a1 according to the number of downlink carrier components and the number of uplink carrier components that the base station apparatus b1 is able to use in the radio communication and the number of downlink carrier components and the number of uplink carrier components that the mobile station apparatus a1 is able to simultaneously transmit or receive. The radio resource control portion b111 also allocates the anchor downlink component carrier to transmit the transmission power control format addressed to the mobile station apparatus a1, to the mobile station apparatus a1 based on the number of mobile station apparatuses a1 accommodated in the downlink carrier component and the channel quality information indicating the quality of the propagation path for the downlink carrier component received from the mobile station apparatus a1. The radio resource control portion b111 allocates to the mobile station apparatus a1 the C-RNTI to identify the mobile station apparatus a1 and the downlink control information, the TPC-PUCCH-RNTI, the TPC-PUSCH-RNTI to identify the transmission power control format, and the number of the TPC command (field), and notifies the mobile station apparatus a1 of this allocation.

The radio resource control portion b111 selects a plurality of downlink carrier components and a plurality of uplink carrier components, and allocates the radio resources in each of the selected downlink carrier components and the selected uplink carrier components to the mobile station apparatus a1 as the radio resources to be allocated with the data information. The radio resource control portion b111 transmits the downlink grant and the uplink grant that indicate the above allocation to the mobile station apparatus a1 through the transmission processing portion b14 as the downlink control information. The downlink grant and the uplink grant are each added with a sequence acquired by executing an exclusive OR operation using the C-RNTI that are allocated to the mobile station apparatus a1 that the downlink grant or the uplink grant corresponds to and the cyclic redundancy check code.

The radio resource control portion b111 executes management, etc., of the various kinds of setting information, the communication state, and the buffer state of each of the mobile station apparatuses a1. The radio resource control portion b111 produces information allocated in each channel of each downlink carrier component or acquires these from an upper node, and outputs these to the transmission processing portion b14 for each downlink carrier component. For example, the radio resource control portion b111 produces the downlink control information and outputs this information to the transmission processing portion b14.

The radio resource control portion b111 produces the control information to execute control of the reception processing portion b13 and the transmission processing portion b14 based on the uplink control information (ACK/NACK, the channel quality information, the scheduling request, and the buffer state of the mobile station apparatus a1) notified of in the physical uplink control channel from the mobile station apparatus a1 and the various kinds of setting information of each of the mobile station apparatuses a1 set by the radio resource control portion b111, and outputs the control information to the control portion b12. For example, when the transmission processing portion b14 allocates the transmission power control format, the radio resource control portion b111 outputs the control information to the control portion b12 such that the transmission power control format is allocated in the common search space of the anchor downlink component carrier allocated to the mobile station apparatus a1 that corresponds to the TPC command included in the transmission power control format.

In the above processes, the transmission power control portion b112 included in the upper layer processing portion b11 determines the transmission power of the uplink channel for each uplink carrier component of each of the mobile station apparatuses a1 based on the information notified of from another base station apparatus b1, the reception power of the uplink channel received from the mobile station apparatus a1 etc. The information notified of from the other base station apparatus b1 is the information on the amount of interference caused by the mobile station apparatus a1 communicating with the base station apparatus b1 to another base station apparatus b1 and the amount of interference that will be caused from now by the mobile station apparatus a1 communicating with another base station apparatus b1 to the base station apparatus b1. When the transmission power control portion b112 determines the transmission power of the uplink channel of each uplink carrier component of each of the mobile station apparatuses a1, the transmission power control portion b112 determines the value of the TPC command to control the transmission power of each uplink carrier component and produces information on the TPC command.

The transmission power control portion b112 produces the transmission power control format by combining the TPC commands corresponding to the mobile station apparatuses a1 allocated with the same anchor downlink component carriers and further allocated with the same TPC-PUCCH-RNTI or the same TPC-PUSCH-RNTI and transmits the format to the mobile station apparatus a1 through the transmission processing portion b14. When the uplink grant or the downlink grant is present, the transmission power control portion b112 includes in the format the TPC command for the uplink carrier component that the uplink grant or the downlink grant corresponds to and transmits the format to the mobile station apparatus a1 through the transmission processing portion b14. The transmission power control format is added with a sequence acquired by executing an exclusive OR operation using the TPC-PUCCH-RNTI or the TPC-PUSCH-RNTI that are allocated to each of the plurality of mobile station apparatuses a1 corresponding to the transmission power control format, and the cyclic redundancy check code. When the TPC commands included in the transmission power control format is for the physical uplink control channel, the TPC-PUCCH-RNTI is used and, when these TPC commands corresponds to the physical uplink shared channel, the TPC-PUSCH-RNTI is used.

The storing portion b113 of the upper layer processing portion b11 has the various kinds of setting information stored therein for each of the mobile station apparatuses a1 set by the radio resource control portion b111 and the transmission power control portion b112. FIG. 6 is a diagram of an example of the various kinds of setting information stored by the storing portion b113 according to the embodiment. In FIG. 6, the setting information is stored for each of N mobile station apparatuses a1 (A1, A2, . . . , AN) and such items are stored in the form of a table that are set by the radio resource control portion b111 and the transmission power control portion b112 of the upper layer processing portion b11 for each of the mobile station apparatuses a1 as: the number of the anchor downlink component carrier; the identifiers (hexadecimal numbers) of the TPC-PUCCH-RNTI and the TPC-PUSCH-RNTI; the number of the TPC command included in the transmission power control format that the uplink carrier component of each of the mobile station apparatuses a1 corresponds to for each TPC-PUCCH-RNTI and each TPC-PUSCH-RNTI; and the value of the transmission power currently instructed to each of the mobile station apparatuses a1 using the TPC command. The cells(grids) are blank for the number of the TPC command and the transmission power for the uplink carrier component not allocated to the mobile station apparatus a1.

In the embodiment, the base station apparatus b1 allocates the same TPC-PUSCH-RNTI and the same TPC-PUCCH-RNTI to the mobile station apparatus a1 to which the base station apparatus b1 allocates the same anchor downlink component carrier, like the mobile station apparatuses A1 and AN of FIG. 6. By doing this, the base station apparatus b1 only has to transmit using one downlink carrier component the transmission power control format that includes one TPC-PUCCH-RNTI and one TPC-PUSCH-RNTI. When the number of mobile station apparatuses a1 to which the same anchor downlink component carriers are allocated is larger than the number of TPC commands that are transmittable using the transmission power control format, the base station apparatus b1 divides the mobile station apparatuses a1 allocated with same anchor downlink component carriers into a plurality of groups and allocates the same TPC-PUCCH-RNTI and the same TPC-PUSCH-RNTI to each of the mobile station apparatuses a1 in the same group.

The TPC-PUCCH-RNTIs and the TPC-PUSCH-RNTIs may each be same or different, that are allocated to the mobile station apparatuses a1 allocated with different anchor downlink component carriers. The base station apparatus b1 allocates the same TPC-PUCCH-RNTIs or the same TPC-PUSCH-RNTIs to the mobile station apparatuses a1 allocated with the different anchor downlink component carriers, thereby, is able to reuse the TPC-PUCCH-RNTI and the TPC-PUSCH-RNTI for each downlink carrier component, and is able to reduce the resources for the identifier (information resources that is able to be indicated by the number of bits used for the identifier).

The TPC-PUCCH-RNTIs and the TPC-PUSCH-RNTIs to be allocated to the mobile station apparatuses a1 to which the base station apparatus b1 allocates different anchor downlink component carriers, are adapted to be always different from each other and, thereby, only one mobile station apparatus group corresponds to one TPC-PUCCH-RNTI and one TPC-PUSCH-RNTI. Therefore, the management of the identifier of the base station apparatus b1 is easy and, therefore, the structure of the base station apparatus b1 is able to be simplified.

In the embodiment, the same TPC command number is allocated regardless of the number of bits of one TPC command included in the transmission power control format. However, a different TPC command number may be allocated to each number of bits of one TPC command included in the transmission power control format.

The control portion b12 produces a control signal to execute control of the reception processing portion b13 and the transmission processing portion b14 based on the control information from the upper layer processing portion b11. The control portion b12 outputs the control signal produced to the reception processing portion b13 and the transmission processing portion b14 and executes the control of the reception processing portion b13 and the transmission processing portion b14.

The reception processing portion b13 demodulates and decodes reception signals received from the mobile station apparatus a1 through the receiving antennas, according to the control signal input thereinto from the control portion b12, and outputs the decoded information to the upper layer processing portion b11.

More specifically, the reception processing portion b13: converts into an intermediate frequency (down-converts) the signal in each uplink carrier component received through each of the receiving antennas; removes unnecessary frequency components therefrom; controls the amplification level for each signal level to be properly maintained; orthogonally demodulates the signal based on an in-phase component and an orthogonal component of the signal received; and converts an analog signal acquired by the orthogonal demodulation into a digital signal. The receiving portion removes a portion that corresponds to a guard interval (GI) from the digital signal acquired by the conversion. The receiving portion applies fast Fourier transform (FFT) to the signal after removal of the guard interval and, thereby, extracts a signal in the frequency region.

The reception processing portion b13 separates the signal extracted for each uplink carrier component into signals allocated in the physical uplink control channel, the physical uplink shared channel, the demodulation reference signal, and the sounding reference signal. The physical uplink control channel is code-multiplexed and, therefore, is separated by executing de-spreading therefor. This separation is executed based on allocation information for the radio resources, that the base station apparatus b1 determines in advance and notifies each of the mobile station apparatuses a1 of. An estimated value of the propagation path is acquired from the uplink reference signal separated, and compensation is executed of the propagation path for the physical uplink control channel and the physical uplink shared channel.

The reception processing portion b13: applies inverse discrete Fourier transform (IDFT) to the physical uplink shared channel; thereby, acquires modulation symbols; and demodulates the signals received for each of the modulation symbols in the physical uplink control channel and the physical uplink shared channel using such a modulation scheme that is determined in advance or that is notified of in advance by the base station apparatus b1 to each of the mobile station apparatuses a1 using the uplink grant, as binary phase shift keying (BPSK), quadrature phase shift keying (QPSK), 16 quadrature amplitude modulation (16QAM), or 64 quadrature amplitude modulation (64QAM).

The reception processing portion b13 decodes: the coded bits of the physical uplink control channel and the physical uplink shared channel demodulated, using a coding scheme determined in advance and at a coding rate determined in advance or notified of in advance by the base station apparatus b1 to each of the mobile station apparatuses a1 using the uplink grant; and outputs the data information and the uplink control information to the upper layer processing portion b11.

The reception processing portion b13 measures reception power of each of the uplink reference signal and the signals received in the physical uplink shared channel that are received from each of the mobile station apparatuses a1, measures the transmission quality of the channel of the uplink carrier component, and outputs the measurement results to the upper layer processing portion b11.

The transmission processing portion b14: produces a downlink reference signal according to the control signal input thereinto from the control portion b12, codes and modulates the data information and the downlink control information input thereinto from the upper layer processing portion b11, and allocates the modulation results in the physical downlink control channel and the physical downlink shared channel, and multiplexes the allocated modulation results with the downlink reference signal produced, and transmits the multiplexing results to the mobile station apparatus a1 through the transmitting antennas.

More specifically, the transmission processing portion b14: codes the downlink control information of each downlink carrier component and the data information input thereinto from the upper layer processing portion b11 according to the control signal input thereinto from the control portion b12 by applying turbo-coding, convolution-coding, block-coding, etc., and modulates the coded bits using a modulation scheme such as QPSK, 16QAM, or 64QAM. The transmission processing portion b14 produces as a downlink reference signal a sequence that is acquired under a predetermined rule based on a cell identifier to identify the base station apparatus b1 and that the mobile station apparatus a1 is known, and multiplexes the physical downlink control channel, the physical downlink shared channel, and the downlink reference signal.

The transmission power control format is multiplexed in a common search space of the anchor downlink component carrier allocated to the mobile station apparatus a1 that the TPC command included in the transmission power control format corresponds to. The downlink grant and the uplink grant are multiplexed in a common search space of the anchor downlink component carrier allocated to the mobile station apparatus a1 that corresponds to the downlink grant and the uplink grant, or in a user equipment-specific search space of each downlink carrier component allocated to this mobile station apparatus a1.

The transmission processing portion b14: applies inverse fast Fourier Transform (IFFT) to the modulation symbol multiplexed; modulates the transform result in the OFDM scheme; adds a guard interval to the OFDM symbol OFDM-modulated; produces a baseband digital signal; converts the baseband digital signal into an analog signal; produces an in-phase component and an orthogonal component of an intermediate frequency from the analog signal; removes unnecessary frequency components for the intermediate frequency band; converts into a signal of a high frequency (up-converts) the signal of the intermediate frequency; removes unnecessary frequency components therefrom; amplifies the power thereof; and transmits the signal by outputting the signal to the transmission antennas.

<About Configuration of Mobile Station Apparatus a1>

Figure 7:
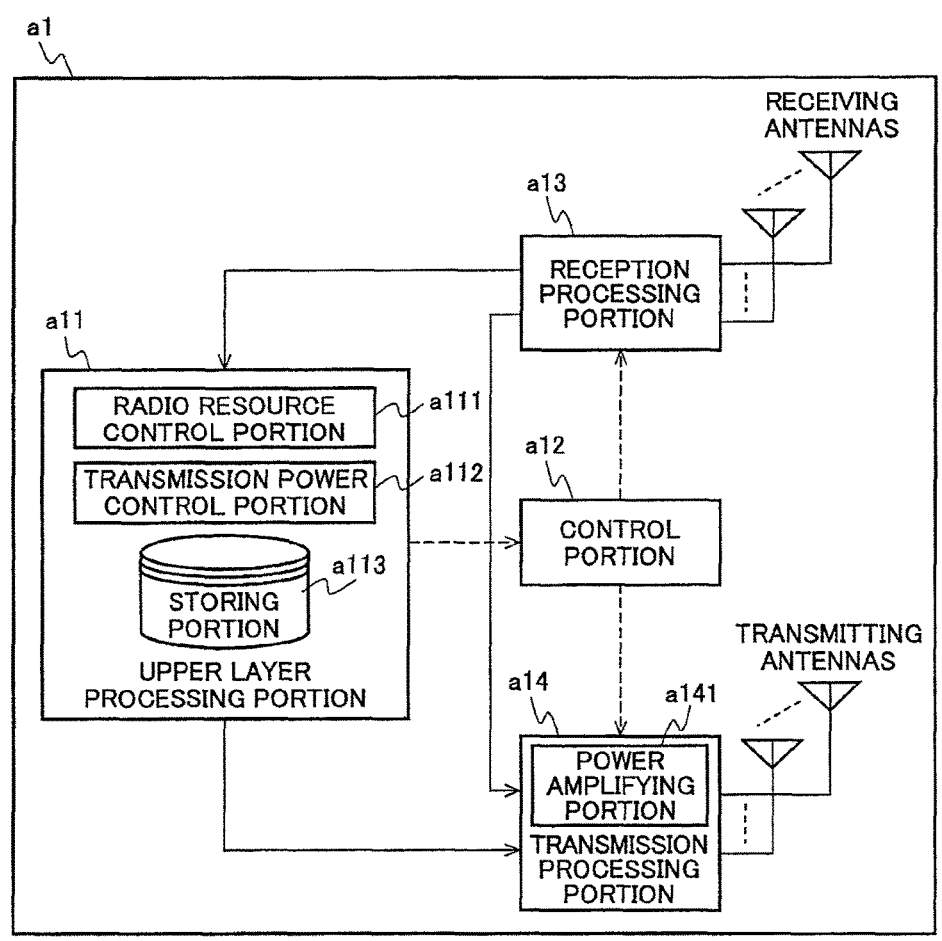
FIG. 7 is a schematic block diagram of the configuration of a mobile station apparatus a1 according to the embodiment.

FIG. 7 is a schematic block diagram of the configuration of the mobile station apparatus a1 according to the embodiment. As depicted, the mobile station apparatus a1 includes an upper layer processing portion a11, a control portion a12, a reception processing portion a13, a plurality of receiving antennas, a transmission processing portion a14, and a plurality of transmitting antennas. The upper layer processing portion a11 includes a radio resource control portion a111, a transmission power control portion a112, and a storing portion a113. The transmission processing portion a14 includes a power amplifying portion a141. Though the receiving antennas and the transmitting antennas are separately configured in FIG. 7, the antennas may be adapted to be commonly used by using thyristor, etc., that achieves an action of switching signals between inputting and outputting.

The upper layer processing portion a11 outputs to the transmission processing portion a14 the data information of each uplink carrier component produced in response to an operation of a user, etc. The upper layer processing portion a11 executes processes for the packet data convergence protocol layer, the radio link control layer, and the radio resource control layer. The radio resource control portion a111 included by the upper layer processing portion a11 executes management, etc., of various kinds of setting information, the communication state, and the buffer state of the mobile station apparatus a1. The transmission power control portion a112 of the upper layer processing portion a11 executes management of the transmission power of the uplink of the mobile station apparatuses a1. The storing portion a113 of the upper layer processing portion a11 has the various kinds of setting information stored therein for the mobile station apparatuses a1 managed by the radio resource control portion a111.

In the above processes, the radio resource control portion a111 included by the upper layer processing portion a11 manages the various kinds of setting information for the downlink carrier components and the uplink carrier components, the anchor downlink component carrier, the C-RNTI, the TRC-PUCCH-RNTI, the TPC-PUSCH-RNTI, etc., allocated to the mobile station apparatus a1. The radio resource control portion a111 also produces information to be allocated in each channel of each uplink carrier component and outputs the information to the transmission processing portion a14 for each uplink carrier component. For example, the radio resource control portion a111 produces ACK/NACK for the data information of the physical downlink shared channel according to the result of the HARQ process and outputs the ACK/NACK produced to the transmission processing portion a14.

The radio resource control portion a111: produces the control information to execute control of the reception processing portion a13 and the transmission processing portion a14 based on the downlink control information notified of from the base station apparatus b1 through the physical downlink control channel (for example, the downlink grant and the uplink grant) and the various kinds of setting information for the mobile station apparatus a1 managed by the radio resource control portion a111; and outputs the control information to the control portion a12. For example, when the reception processing portion a13 monitors the physical downlink control channel, the radio resource control portion a111 outputs the control information to the control portion a12 to monitor the transmission power control format in the common search space of the anchor downlink component carrier, and monitor the downlink grant and the uplink grant addressed to the mobile station apparatus a1 in the common search space of the anchor downlink component carrier and user equipment-specific search space of each downlink carrier component.

In the above processes, the transmission power control portion a112 included by the upper layer processing portion a11 executes the control of the transmission power of the uplink channels based on the TPC command notified of from the base station apparatus b1, the path loss measured by the mobile station apparatus a1 from the downlink reference signal, etc., and produces the control information to execute control of the power amplifying portion a141, and outputs the control information to the control portion a12.

The storing portion a113 of the upper layer processing portion a11 has various kinds of setting information stored therein of the mobile station apparatus a1 managed by the radio resource control portion a111 and the transmission power control portion a112. FIG. 8 is a diagram of an example of the various kinds of setting information stored in the storing portion a113 according to the embodiment. In FIG. 8, such items are stored in the form of a table as the number of the anchor downlink component carrier set in the mobile station apparatus a1 by the base station apparatus b1, and the identifiers (hexadecimal numbers) of the TPC-PUCCH-RNTI and the TPC-PUSCH-RNTI, and the number of each TPC command included in the transmission power control format that the uplink carrier component of the mobile station apparatuses a1 corresponds to for each TPC-PUCCH-RNTI and each TPC-PUSCH-RNTI, and the value of the transmission power currently instructed to the mobile station apparatuses a1 using the TPC command.

When the mobile station apparatus a1 simultaneously receives the TPC command of the transmission power control format that includes the TPC-PUCCH-RNTI and the TPC command of the downlink grant, the uplink carrier component that the TPC command of the downlink grant corresponds to is applied with the TPC command of the downlink grant and the uplink carrier component that no TPC command of the downlink grant corresponds to is applied with the TPC command of the format 3/3A. When the mobile station apparatus a1 simultaneously receives the TPC command of the transmission power control format that includes the TPC-PUSCH-RNTI and the TPC command of the uplink grant, the uplink carrier component that the TPC command of the uplink grant corresponds to is applied with the TPC command of the uplink grant and the uplink carrier component that no TPC command of the uplink grant corresponds to is applied with the TPC command of the format 3/3A.

Figure 9:
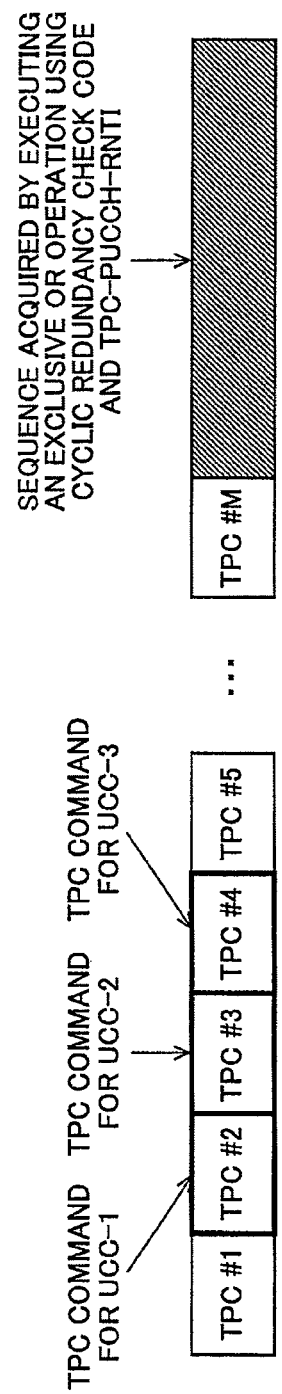
FIG. 9 is a diagram of an example of the configuration of a transmission power control format according to the embodiment.

FIG. 9 is a diagram of an example of the configuration of the transmission power control format according to the embodiment. In FIG. 9, the transmission power control format includes M TPC commands (squares each added with "TPC #i"; "i" is an integer) and a square with slant lines therein represents a sequence acquired by executing an exclusive OR operation using the cyclic redundancy check code produced from the M TPC commands and the TPC-PUCCH-RNTI (or TPC-PUSCH-RNTI).

For example, when the mobile station apparatus a1 having the setting information like that of FIG. 8 detects the transmission power control format in the common search space of the downlink carrier component of DCC-2 that is the anchor downlink component carrier, using an identifier "0001" that is the TPC-PUCCH-RNTI allocated to the mobile station apparatus a1, the mobile station apparatus a1 determines the second TPC command of the transmission power control format detected to be the TPC command for the uplink carrier component of UCC-1, the third TPC command thereof to be the TPC command for the uplink carrier component of UCC-2, and the fourth TPC command thereof to be the TPC command for the uplink carrier component of UCC-3; and updates the value of the transmission power instructed by the TPC command in the storing portion a113 of the upper layer processing portion a11.

The control portion a12 produces a control signal to execute the control of the reception processing portion a13 and the transmission processing portion a14 based on the control information from the upper layer processing portion a11. The control portion a12 outputs the control signal produced to the reception processing portion a13 and the transmission processing portion a14 and executes the control for the reception processing portion a13 and the transmission processing portion a14.

The reception processing portion a13 demodulates and decodes the reception signals received from the base station apparatus b1 through the receiving antennas according to the control signal input thereinto from the control portion a12, and outputs the information decoded to the upper layer processing portion a11. The reception processing portion a13 produces the channel quality information based on the reception quality of the downlink reference signal detected, etc., and outputs the channel quality information to the transmission processing portion a14.

More specifically, the reception processing portion a13: converts into an intermediate frequency (down-converts) the signal in each uplink carrier component received through each of the receiving antennas; removes unnecessary frequency components therefrom; controls the amplification level for each signal level to be properly maintained; orthogonally demodulates the signal based on an in-phase component and an orthogonal component of the signal received; and converts each analog signal acquired by the orthogonal demodulation into a digital signal. The receiving portion a13 removes a portion that corresponds to a guard interval from the digital signal acquired by the conversion. The receiving portion a13 applies fast Fourier transform to the signal after removal of the guard interval and, thereby, extracts a signal in the frequency region.

The reception processing portion a13 separates the signal extracted for each downlink carrier component into signals allocated in the physical downlink control channel, the physical downlink shared channel, and the downlink reference signal. This separation is executed based on the allocation information on the radio resources notified of using the downlink grant. The reception processing portion a13 acquires an estimated value of each propagation path from the downlink reference signal separated and compensates the propagation paths of the physical downlink control channel and the physical downlink shared channel. The reception processing portion a13 produces the channel quality information based on the reception quality of the downlink reference signal separated, etc., and outputs the channel quality information to the transmission processing portion a14.

The reception processing portion a13: executes demodulation in the QPSK demodulation scheme for the downlink control channel; monitors the transmission power control format in the common search space of the anchor downlink component carrier and monitors the downlink grant and the uplink grant in the user equipment-specific search space of each of the downlink carrier components set and in the common search space of the anchor downlink component carrier; and tries demodulating the above. When the reception processing portion a13 successfully executes the demodulation of the physical downlink control channel, the reception processing portion a13 outputs the downlink control information demodulated to the upper layer processing portion a11.

The reception processing portion a13 executes demodulation for the physical downlink shared channel in the modulation scheme notified of using the downlink grant such as QPSK, 16QAM, or 64QAM, executes decoding for the coding rate notified of using the downlink grant, and outputs the data information to the upper layer processing portion a11.

The transmission processing portion a14: produces the uplink reference signal according to the control signal input thereinto from the control portion a12; codes and modulates the data information and ACK/NACK input thereinto from the upper layer processing portion a11 and the channel quality information input thereinto from the reception processing portion a13; disposes the modulation results in the physical uplink shared channel and the physical uplink control channel; multiplexes the disposed modulation results with the uplink reference signal produced; and transmits the multiplexing results to the base station apparatus b1 through the transmitting antennas.

More specifically, the transmission processing portion a14: codes the uplink control information of each uplink carrier component and the data information input thereinto from the upper layer processing portion a11 and the reception processing portion a13 according to the control signal input thereinto from the control portion a12 by applying turbo-coding, convolution-coding, block-coding, etc.; and modulates the coded bits using a modulation scheme such as BPSK, QPSK, 16QAM, or 64QAM.

The transmission processing portion a14 produces as an uplink reference signal a sequence that the base station apparatus b1 is known and that is acquired under a predetermined rule based on a cell identifier to identify the base station apparatus b1, etc. The transmission processing portion a14 diffuses using a code the modulation symbols of the physical uplink control channel, applies discrete Fourier transform (DFT) to the diffused modulation symbols after re-arranges the modulation symbols in parallel to each other, and multiplexes the transform result with the uplink reference signal produced.

The transmission processing portion a14 applies inverse fast Fourier transform to the signal multiplexed modulates the transform result in the SC-FDMA scheme; adds the guard interval to the SC-FDMA symbol SC-FDMA-modulated; produces a baseband digital signal converts the baseband digital signal into an analog signal produces an in-phase component and an orthogonal component of an intermediate frequency from the analog signal removes unnecessary frequency components for the intermediate frequency band therefrom; converts into a signal of a high frequency (up-converts) the signal of the intermediate frequency removes unnecessary frequency components therefrom amplifies the power of the signal and transmits the signal by outputting the signal to the transmission antennas.

In the above processes, the power amplifying portion a141 amplifies the transmission power of each of the physical uplink control channel, the physical uplink shared channel, and the sounding reference signal according to the control signal input thereinto from the control portion a12. The transmission power of the demodulation reference signal is amplified to the same value as that of the transmission power of the channel with which the demodulation reference signal is time-multiplexed.

<About Operations of Radio Communication System>

Operations of the radio communication system will be described.

Figure 10:
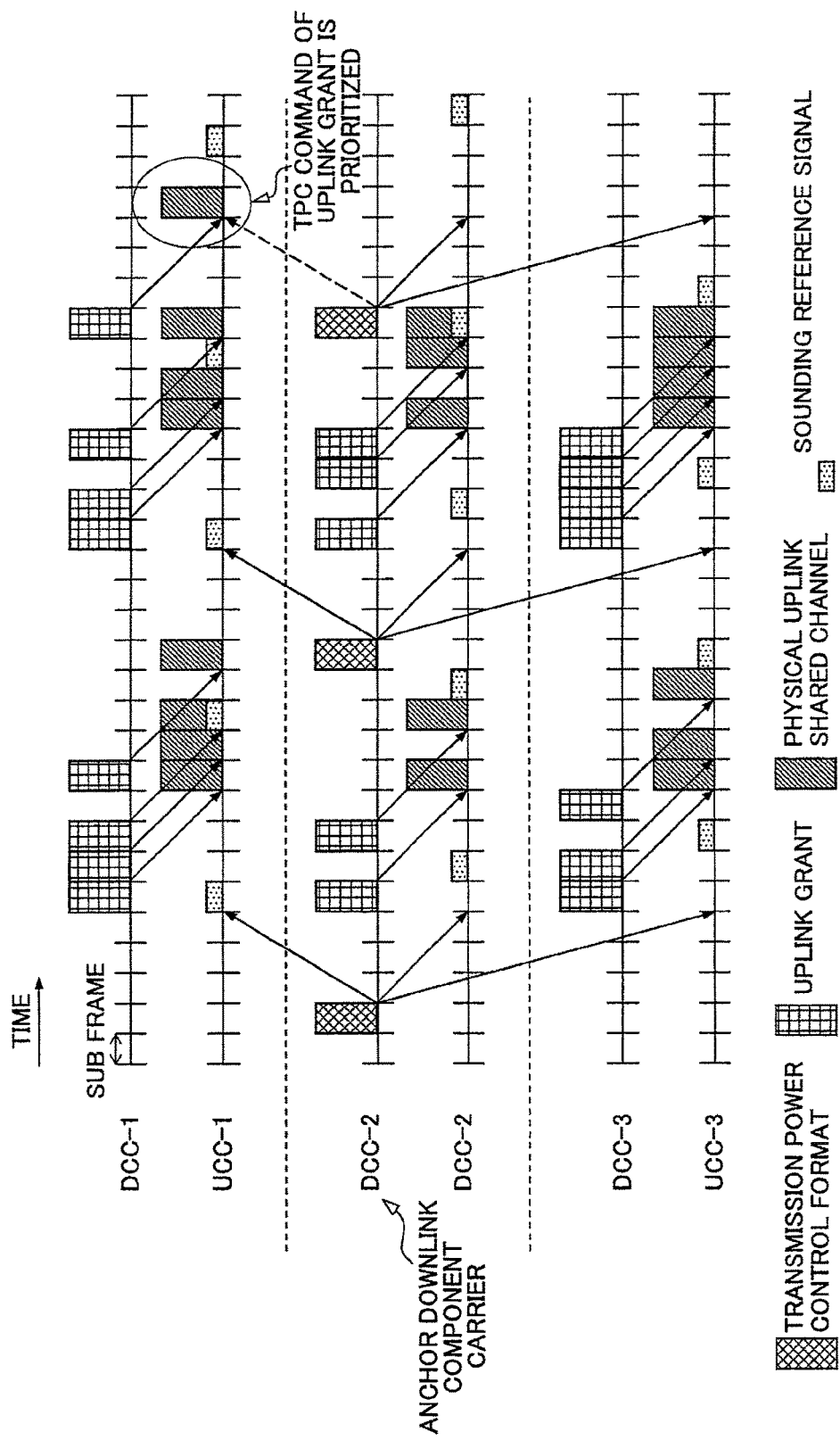
FIG. 10 is a diagram of a method of applying a TPC command to a physical uplink shared channel of the mobile station apparatus a1 according to the embodiment.

FIG. 10 is a diagram of a method of applying the TPC command to the physical uplink shared channel of the mobile station apparatus a1 according to the embodiment. FIG. 10 depicts the case where the mobile station apparatus a1 is allocated with the downlink carrier components (DCC-1, DCC-2, and DCC-3) and the uplink carrier components (UCC-1, UCC-2, and UCC-3) as depicted in FIG. 2 and DCC-2 is set as the anchor downlink component carrier.

In FIG. 10 the axis of abscissa represents the time region; squares added therein with slant grid lines represent a transmission power control format including the TPC-PUSCH-RNTI allocated to the mobile station apparatus a1; squares added therein with longitudinal and lateral grid lines represent an uplink grant; squares added therein with slant lines represent the physical uplink shared channel; squares added therein with dots each represent the sounding reference signal; and thick arrows represent the transmission power control format, the uplink carrier component that the TPC command for the the physical uplink shared channel and the sounding reference signal included in the uplink grant correspond to, and the time point at which the TPC command is applied with.

In FIG. 10 the TPC command included in the uplink grant received using DCC-1 is for UCC-1; the TPC command included in the uplink grant received using DCC-2 is for the uplink grant for UCC-2; the TPC command included in the uplink grant received using DCC-3 is for UCC-3; and the transmission power control format received in the common search space of DCC-2 includes the TPC commands for UCC-1, UCC-2, and UCC-3.

The sounding reference signal is allocated with cyclic radio resources for each uplink carrier component. The information and the TPC command concerning the physical uplink shared channel of the uplink grant received using each of the downlink carrier components DCC-i (i=1, 2, and 3) are for each of the uplink carrier components UCC-i (i=1, 2, and 3) four sub frames after the reception of the uplink grant. The TPC command of the transmission power control format received in the common search space of the anchor downlink component carrier DCC-2 is for each of the uplink carrier components four sub frames after the reception of the transmission power control format.

When the mobile station apparatus a1 simultaneously receives the TPC command of the uplink grant and the TPC command of the transmission power control format for the same uplink carrier component like the sub frame of the uplink carrier component UCC-1 surrounded by a thick line circle of FIG. 10, the mobile station apparatus a1 applies the TPC command of the uplink grant with priority. The mobile station apparatus a1 determines in advance which of the TPC commands of the uplink grant and the transmission power control format is selected and, thereby, the operations are able to be clarified that are executed when mobile station apparatus a1 receives the TPC commands that are different between the uplink grant and the transmission power control format. The base station apparatus b1 detects whether the mobile station apparatus a1 transmits the physical uplink shared channel that the uplink grant corresponds to thereby, is able to grasp whether the mobile station apparatus a1 accurately receives the uplink grant and accurately applies the TPC command and, therefore, is able to execute more accurate control of the transmission power by selecting the TPC command of the uplink grant with priority. The same holds for the transmission power control format including the TPC-PUCCH-RNTI and the TPC command included in the downlink grant, and the mobile station apparatus a1 selects with priority the TPC command of the downlink grant.

Figure 11:
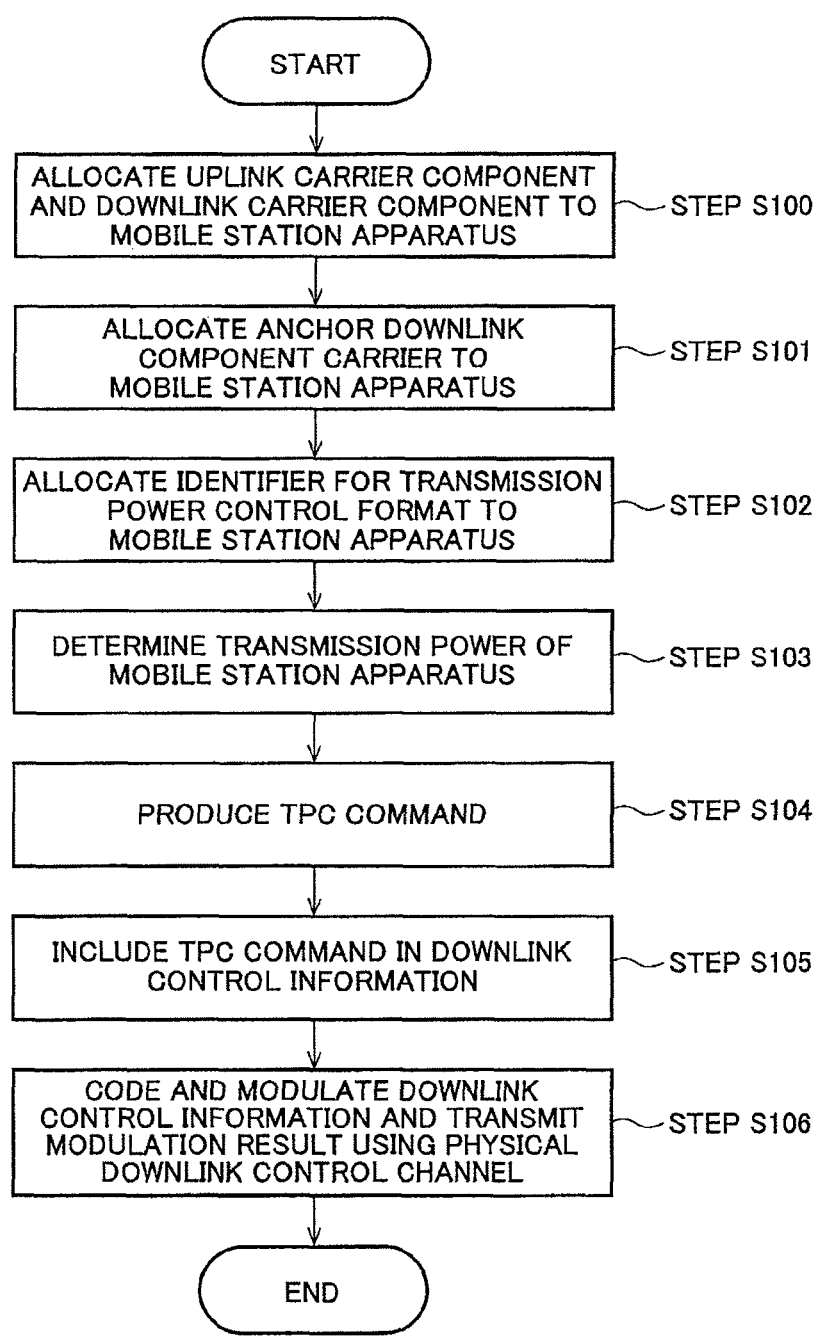
FIG. 11 is a flowchart of an example of operations of the base station apparatus b1 according to the embodiment.

FIG. 11 is a flowchart of an example of operations of the base station apparatus b1 according to the embodiment.

(Step S100) The base station apparatus b1 allocates to the mobile station apparatus a1 a plurality of uplink carrier components and a plurality of downlink carrier components according to the number of downlink carrier components and the number of uplink carrier components that are available for the base station apparatus b1 in the radio communication and the number of downlink carrier components and the number of uplink carrier components that the mobile station apparatus a1 is able to simultaneously transmit or receive etc. The procedure advances to step S101.

(Step S101) The base station apparatus b1 allocates the anchor downlink component carrier that transmits the transmission power control format addressed to the mobile station apparatus to the mobile station apparatus a1 based on the number of mobile station apparatuses a1 accommodated in the downlink carrier component and the channel quality information indicating the quality of the propagation path for the downlink carrier component received from the mobile station apparatus a1. The procedure advances to step S102.

(Step S102) The base station apparatus b1 allocates to the mobile station apparatus a1 the identifiers (TPC-PUCCH-RNTI and TPC-PUSCH-RNTI) to identify the transmission power control format and the channel that the TPC command included in the transmission power control format corresponds to and numbers to identify a plurality of TPC commands for the uplink carrier components allocated to the mobile station apparatus a1 included in the transmission power control format. The base station apparatus b1 divides the mobile station apparatuses a1 into a plurality of groups each including the mobile station apparatuses a1 allocated with same anchor downlink component carriers, and allocates the same TPC-PUCCH-RNTI and the same TPC-PUSCH-RNTI to each of the mobile station apparatuses a1 in the same group. The procedure advances to step S103.

(Step S103) The base station apparatus b1 determines the transmission power of the channel of the mobile station apparatus a1 based on the amount of interference caused by the mobile station apparatus a1 communicating with the base station apparatus b1 to another base station apparatus b1, that is notified of from the other base station apparatus b1; and the reception power of the uplink channel received from the mobile station apparatus a1, etc. The procedure advances to step S104.

(Step S104) The base station apparatus b1 produces a TPC command to be notified of to the mobile station apparatus a1 such that the transmission power of each uplink channel is the transmission power determined at step S103. The procedure advances to step S105.

(Step S105) The base station apparatus b1 produces the transmission power control format from the TPC command for each of the mobile station apparatuses a1 each allocated with the same identifier, of the plurality of TPC commands produced at step S104. When the uplink grant or the downlink grant is present, the TPC command is included in the uplink grant or the downlink grant. The procedure advances to step S106.

(Step S106) The base station apparatus b1 codes and modulates the downlink control information (the transmission power control format, the downlink grant, and the uplink grant) and transmits the modulation results using the physical downlink control channel. The transmission power control format is allocated in the common search space of the anchor downlink component carrier allocated to each of the mobile station apparatuses a1 at step S101. The downlink grant and the uplink grant are allocated in the common search space of the anchor downlink component carrier or the user equipment-specific search space of each downlink carrier component.

After step S106, the base station apparatus b1 causes the process concerning the transmission power control of each of the uplink channels to come to an end.

Figure 12:
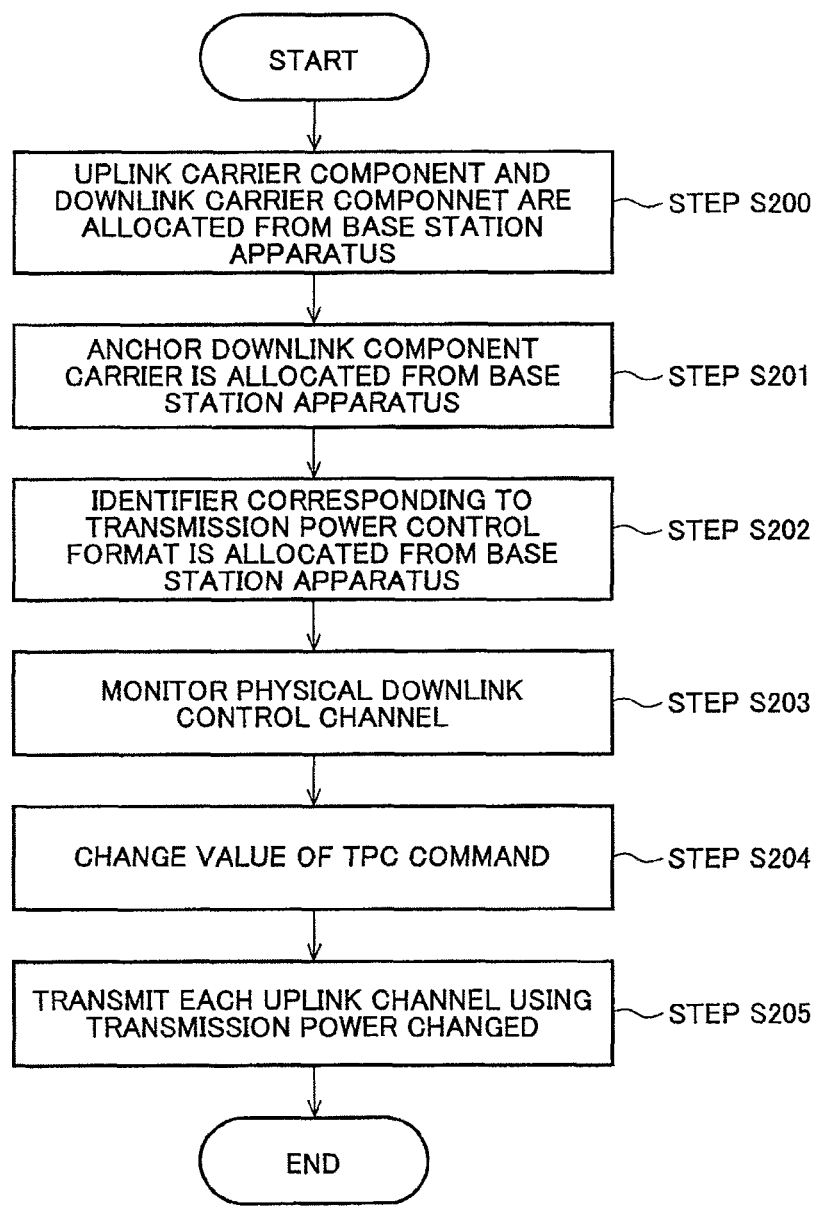
FIG. 12 is a flowchart of an example of operations of the mobile station apparatus a1 according to the embodiment.

FIG. 12 is a flowchart of an example of operations of the mobile station apparatus a1 according to the embodiment. (Step S200) The mobile station apparatus a1 is allocated with a plurality of uplink carrier components and a plurality of downlink carrier components to be used in the radio communication, from the base station apparatus b1. The procedure advances to step S201. (Step S201) The mobile station apparatus a1 is allocated from the base station apparatus b1 with the anchor downlink component carrier with which the transmission power control format addressed to the mobile station apparatus a1 is transmitted. The procedure advances to step S202.

(Step S202) The mobile station apparatus a1 is allocated by the base station apparatus b1 with the identifiers (the TPC-PUCCH-RNTI and the TPC-PUSCH-RNTI) to identify the transmission power control format and the channel that the TPC command included in the transmission power control format corresponds to and numbers to identify the plurality of TPC commands for the uplink carrier components allocated to the mobile station apparatus a1 included in the transmission power control format. The procedure advances to step S203.

(Step S203) The mobile station apparatus a1 monitors the transmission power control format using the TPC-PUCCH-RNTI and the TPC-PUSCH-RNTI in the common search space of the anchor downlink component carrier, and the downlink grant and the uplink grant using the C-RNTI in the common search space of the anchor downlink component carrier and in the user equipment-specific search space of each of the downlink carrier components, and tries demodulating and decoding the above. The procedure advances to step S204.

(Step S204) When the mobile station apparatus a1 successfully executes the demodulation of the transmission power control format, the downlink grant, or the uplink grant at step S203, the mobile station apparatus a1 updates the value of the TPC command for each of the uplink carrier components stored by the mobile station apparatus a1 using the TPC command included in the transmission power control format, the downlink grant, or the uplink grant. The procedure advances to step S205.

(Step S205) The mobile station apparatus a1 applies the value of the TPC command updated at step S204 to the channel of the uplink sub frame after a time period determined in advance elapses, and transmits the uplink channel.

After step S205, the mobile station apparatus a1 causes the process concerning the transmission power control of each of the uplink channels to come to an end.

As above, according to the embodiment, in the radio communication system the base station apparatus b1 allocates the plurality of uplink carrier components and the plurality of downlink carrier components to the mobile station apparatus a1, sets the anchor downlink component carrier in the mobile station apparatus a1, notifies the mobile station apparatus a1 of the anchor downlink component carrier set, collectively includes the plurality of TPC commands for each of the uplink carrier components of the mobile station apparatus a1 in one piece of downlink control information, and transmits the downlink control information that includes the TPC commands for the plurality of uplink carrier components using the anchor downlink component carrier set and the mobile station apparatus a1 monitors the downlink control information that includes the TPC commands for each of the uplink carrier components of the mobile station apparatus a1 using only the anchor downlink component carrier set. Thereby, in the radio communication system, the base station apparatus b1 can use only one piece of downlink control information to transmit the TPC commands of each of the uplink carrier components to the mobile station apparatus a1 and, therefore, the overhead of the downlink control information is able to be reduced.

In the embodiment, in the radio communication system, the mobile station apparatus a1 can monitor the downlink control information using only one downlink carrier component and, therefore, the load of the processes executed when the downlink control information of the mobile station apparatus a1 is monitored.

(First Reference Example)

A first reference example of the present invention will now be described in detail with reference to the accompanying drawings.

In the embodiment, the radio communication system has been described for the case where the base station apparatus b1 sets as the anchor downlink component carrier the one downlink carrier component of the plurality of downlink carrier components allocated by the base station apparatus b1 to the mobile station apparatus a1 and transmits the transmission power control format using the one anchor downlink component carrier set. In the reference example, the case will be described where a base station apparatus divides a plurality of uplink carrier components allocated to a mobile station apparatus into a plurality of (L) groups and sets a downlink carrier component as the anchor downlink component carrier for each of the uplink carrier component groups and transmits the transmission power control format using the one or more anchor downlink component carrier(s) set.

Comparing the radio communication system according to the reference example with the radio communication system according to the embodiment, an upper layer processing portion of the mobile station apparatus and an upper layer processing portion of the base station apparatus differ between the radio communication systems. However, the configuration and the functions that the other components have are the same as those of the first embodiment. Therefore, the same functions as those of the first embodiment will not again be described. A mobile station apparatus according to the embodiment will be referred to as "mobile station apparatus a2" and a base station apparatus according thereto will be referred to as "base station apparatus b2".

Figure 13:
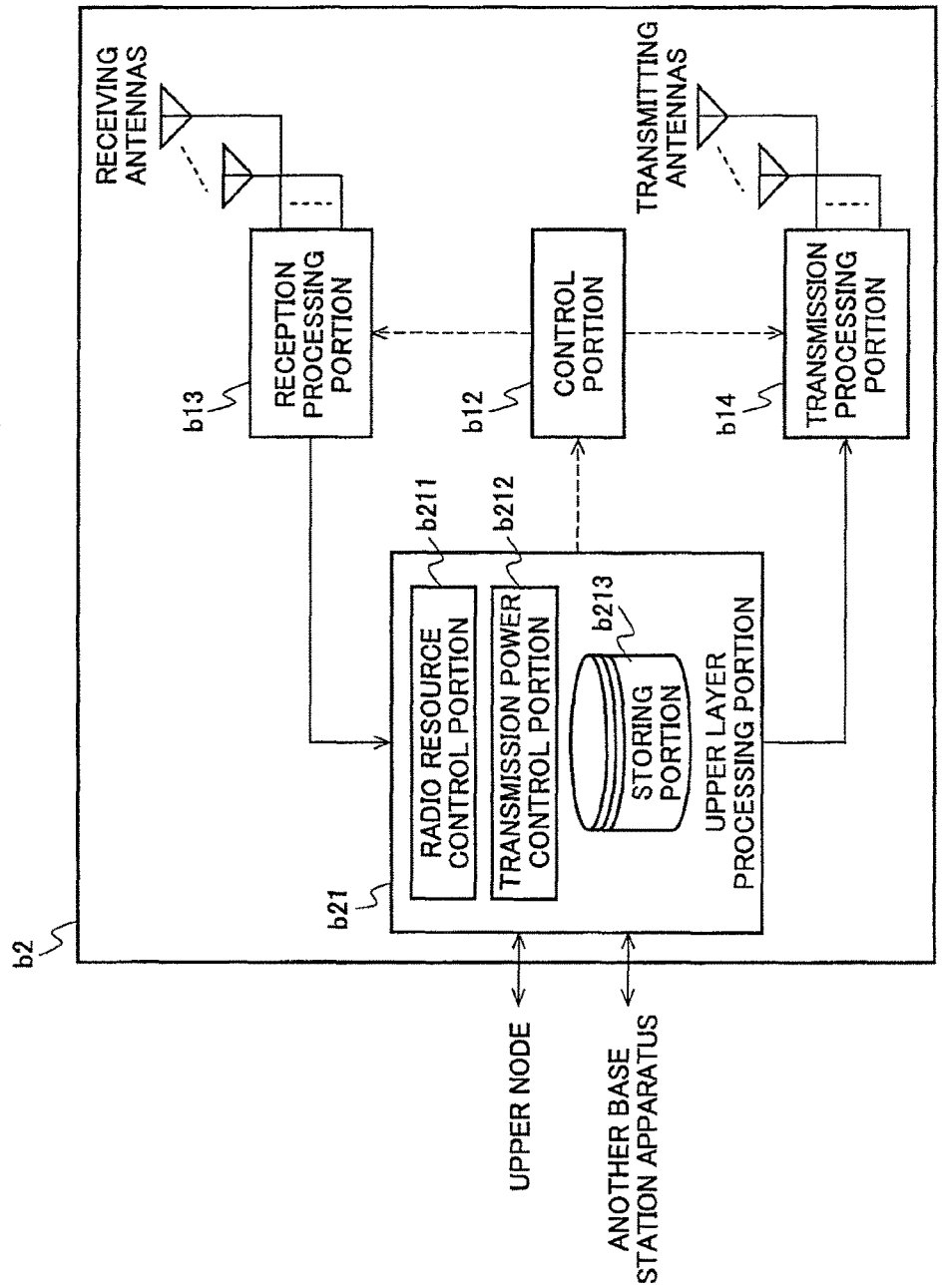
FIG. 13 is a schematic block diagram of the configuration of a base station apparatus b2 according to a first reference example of the present invention.

FIG. 13 is a schematic block diagram of the configuration of the base station apparatus b2 according to the first reference example of the present invention. Comparing an upper layer processing portion b21 according to the reference example (FIG. 13) with the upper layer processing portion b11 according to the embodiment (FIG. 5), a radio resource control portion b211, a transmission power control portion b212, and a storing portion b213 are different between the upper layer processing portions b21 and b11. However, the functions that the other components (the control portion b12, the reception processing portion b13, and the transmission processing portion b14) have are the same as those of the embodiment. The same functions as those of the embodiment will not again be described.

Processes of the upper layer processing portion b21 of the base station apparatus b2 will be described below.

In the reference example, the upper layer processing portion b21 outputs data information of each downlink carrier component to the transmission processing portion b14. The upper layer processing portion b21 executes processes for the packet data convergence protocol layer, the radio link control layer, and the radio resource control layer. The radio resource control portion b211 of the upper layer processing portion b21 executes management, etc., of various kinds of setting information, the communication state, and the buffer state of each of the mobile station apparatuses a2. The transmission power control portion b212 of the upper layer processing portion b21 executes management of the uplink transmission power of each of the mobile station apparatuses a2. The storing portion b213 of the upper layer processing portion b21 has the various kinds of setting information stored therein for each of the mobile station apparatuses a2 set by the radio resource control portion b211 and the transmission power control portion b212.

In the above processes, the radio resource control portion b211 included by the upper layer processing portion b21 allocates a plurality of uplink carrier components and a plurality of downlink carrier components to the mobile station apparatus a2 according to the number of downlink carrier components and the number of uplink carrier components that the base station apparatus b2 is able to use in the radio communication, and the number of downlink carrier components and the number of uplink carrier components that the mobile station apparatus a2 is able to simultaneously transmit or receive. The radio resource control portion b211 divides the uplink carrier components into a plurality of groups based on the frequency band (for example, 800 MHz or 3 GHz) and the coverage of the uplink carrier component managed by the base station apparatus b2, and interference from an adjacent base station apparatus b2, etc., and notifies each of the mobile station apparatuses a2 of the group configuration of the uplink carrier components.

The radio resource control portion b211 allocates to each of the mobile station apparatuses a2 the anchor downlink component carrier to transmit the transmission power control format addressed to the mobile station apparatus a2, for each of the uplink carrier component groups, based on the number of mobile station apparatuses a2 accommodated in the downlink carrier component, the channel quality information indicating the quality of the propagation path for the downlink carrier components received from the mobile station apparatus a2, the frequency band and the coverage of the uplink carrier component, interference from an adjacent base station apparatus b2, etc. The radio resource control portion b211 allocates to each of the mobile station apparatuses a2 the C-RNTI to identify the downlink control information addressed to the mobile station apparatus a2, the TPC-PUCCH-RNTI to identify the transmission power control format for each anchor downlink component carrier, the TPC-PUSCH-RNTI, and the number of the TPC command, and notifies each of the mobile station apparatuses a2 of the allocation.

The radio resource control portion b211 may always allocate a different downlink carrier component as the anchor downlink component carrier to be allocated to each of the uplink carrier component groups, or may allocate same downlink carrier components to the plurality of uplink carrier component groups as the anchor downlink carrier components.

When the anchor downlink component carrier allocated to each of the uplink carrier component groups differs from each other, the radio resource control portion b211 may use same TPC-PUCCH-RNTIs and same TPC-PUSCH-RNTIs for a plurality of anchor downlink component carriers. Thereby, the mobile station apparatus a2 is able to identify the uplink carrier component group that the transmission power control format corresponds to, from the anchor downlink component carrier from which the transmission power control format including the TPC-PUCCH-RNTI or the TPC-PUSCH-RNTI is detected. The radio resource control portion b211 is able to reduce the resources for the identifiers by reusing, for each of the uplink carrier component groups, the resources for the identifiers to be allocated to the TPC-PUCCH-RNTI and the TPC-PUSCH-RNTI.

When the anchor downlink component carrier to be allocated to each of the uplink carrier component groups differs from each other, the radio resource control portion b211 may allocate to each of the uplink carrier component groups, the TPC-PUCCH-RNTI and the TPC-PUSCH-RNTI that always differ from each other among the groups. Thereby, the base station apparatus b2 can only manage the TPC-PUCCH-RNTIs and the TPC-PUSCH-RNTIs for the whole uplink carrier component groups and, therefore, the structure of the base station apparatus b2 is able to be simplified.

When the radio resource control portion b211 allocates same downlink carrier components to the plurality of uplink carrier component groups as the anchor downlink component carrier, the radio resource control portion b211 may allocate a different TPC-PUCCH-RNTI and a different TPC-PUSCH-RNTI for each of the uplink carrier component groups. Thereby, the mobile station apparatus a2 is able to identify the uplink carrier component group that the transmission power control format corresponds to, from the TPC-PUCCH-RNTI or the TPC-PUSCH-RNTI included in the transmission power control format detected and, thereby, is able to reduce the number of downlink carrier components for the mobile station apparatus a2 to monitor the common search space.

The radio resource control portion b211 produces the control information to execute the control of the reception processing portion b13 and the transmission processing portion b14 based on the uplink control information (ACK/NACK, the channel quality information, the scheduling request, and the buffer state of the mobile station apparatus a2) notified of using the physical uplink control channel from the mobile station apparatus a2 and the various kinds of setting information for each of the mobile station apparatuses a2 set by the radio resource control portion b211, and the radio resource control portion b211 outputs the control information to the control portion b12. For example, when the transmission processing portion b14 allocates the transmission power control format, the radio resource control portion outputs the control information to the control portion b12 such that the transmission power control format is allocated in the common search space of the anchor downlink component carrier allocated to the uplink carrier component group that the transmission power control format corresponds to.

In the above processes, the transmission power control portion b212 included in the upper layer processing portion b21 produces the transmission power control format by combining the TPC commands for the uplink carrier component group of the mobile station apparatuses a2 allocated with the same TPC-PUCCH-RNTIs or the same TPC-PUSCH-RNTIs for the same anchor downlink component carrier.

The storing portion b213 of the upper layer processing portion b21 has the various kinds of setting information stored therein for each of the mobile station apparatuses a2 set by the radio resource control portion b211 and the transmission power control portion b212. FIG. 14 is a diagram of an example of the various kinds of setting information stored by the storing portion b213 according to the reference example. In FIG. 13, the pieces of setting information are stored for each of N mobile station apparatuses a2 (A1, A2, . . . , AN) and the uplink carrier components are divided into a group including UCC-1 and UCC-2 and another group including UCC-3 and UCC-4.

For example, in FIG. 14, the storing portion b213 has such items stored therein as the various kinds of setting information set by the radio resource control portion b211 and the transmission power control portion b212 for the group including UCC-1 and UCC-2 of the mobile station apparatus A1, "DCC-2" as the anchor downlink component carrier, "0001" as the TPC-PUCCH-RNTI, "2" as the number of the TPC command for the physical uplink control channel for UCC-1, "0 dBm" as the value of the TPC command for the physical uplink control channel of UCC-1, "3" as the number of the TPC command for the physical uplink control channel for UCC-2, "4 dBm" as the value of the TPC command for the physical uplink control channel of UCC-2, "0002" as the TPC-PUSCH-RNTI, "4" as the number of the TPC command for the physical uplink shared channel for UCC-1, "0 dBm" as the value of the TPC command for the physical uplink shared channel of UCC-1, "1" as the number of the TPC command for the physical uplink control channel for UCC-2, and "1 dBm" as the value of the TPC command for the physical uplink shared channel of UCC-2.

Such items are also stored in the form of a table as the number of the anchor downlink component carrier set by the radio resource control portion b211 and the transmission power control portion b212 of the upper layer processing portion b21 in each of the mobile station apparatuses a2 for each of the uplink carrier component groups, and the identifiers (hexadecimal numbers) of the TPC-PUCCH-RNTI and the TPC-PUSCH-RNTI, and the number of each TPC command included in the transmission power control format that the uplink carrier component of each of the mobile station apparatuses a2 corresponds to for each TPC-PUCCH-RNTI and each TPC-PUSCH-RNTI, and the value of the transmission power currently instructed to each of the mobile station apparatuses a2 using the TPC command. In FIG. 14, the cells(grids) are blank for the number of the TPC command for the uplink carrier component not allocated to the mobile station apparatus a2 by the base station apparatus b2, and the transmission power therefor.

Figure 15:
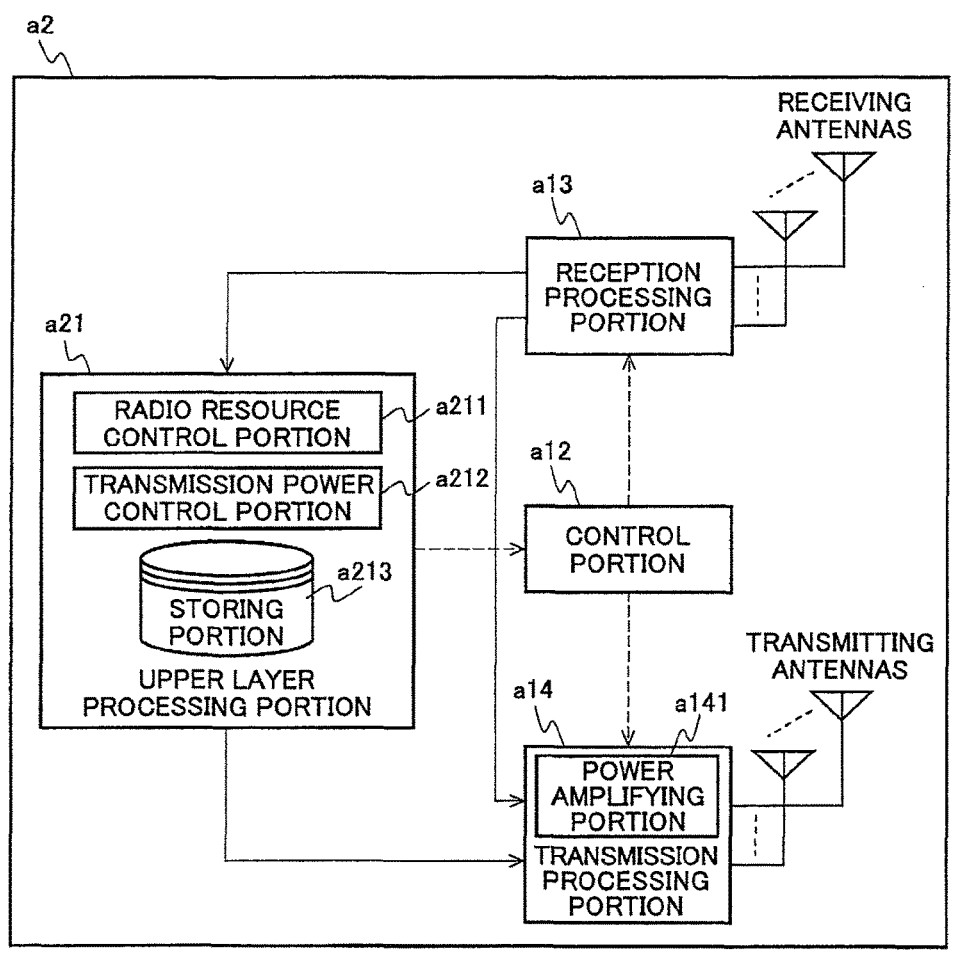
FIG. 15 is a schematic block diagram of the configuration of a mobile station apparatus a2 according to the first reference example of the present invention.

FIG. 15 is a schematic block diagram of the configuration of the mobile station apparatus a2 according to the first reference example of the present invention. Comparing an upper layer processing portion a21 according to the reference example (FIG. 15) with the upper layer processing portion a11 according to the embodiment (FIG. 7), a radio resource control portion a211 and a storing portion a213 are different between the embodiments. However, the functions that the other components (the transmission power control portion a112, the control portion a12, the reception processing portion a13, and the transmission processing portion a14) have are same as those of the embodiment. Therefore, the same functions as those of the embodiment will not again be described.

Processes of the upper layer processing portion a21 of the mobile station apparatus a2 will be described below.

In the reference example, the upper layer processing portion a21 outputs to the transmission processing portion a14 the data information for each uplink carrier component produced in response to an operation of a user, etc. The upper layer processing portion a21 executes processes for the packet data convergence protocol layer, the radio link control layer, and the radio resource control layer. The radio resource control portion a211 included in the upper layer processing portion a21 executes management of various kinds of setting information, the communication state, and the buffer state of the mobile station apparatus a2, etc. The storing portion a213 of the upper layer processing portion a21 has the various kinds of setting information stored therein of the mobile station apparatus a2 managed by the radio resource control portion e21.

In the above processes, the radio resource control portion a211 included in the upper layer processing portion a21 manages the various kinds of setting information such as the C-RNTI allocated to the mobile station apparatus a2, the downlink carrier components and the uplink carrier components, the group configuration of the uplink carrier components set, and the anchor downlink component carrier, the TPC-PUCCH-RNTI, and the TPC-PUSCH-RNTI of each of the uplink carrier component groups. The radio resource control portion a211 produces information to be allocated in each channel of each uplink carrier component and outputs the information to the transmission processing portion a14 for each uplink carrier component.

The radio resource control portion a211 produces the control information to execute the control of the reception processing portion a13 and the transmission processing portion a14 based on the downlink control information (for example, the downlink grant and the uplink grant) notified of in the physical downlink control channel from the base station apparatus b2 and the various kinds of setting information of the mobile station apparatus a2 managed by the radio resource control portion a211 and outputs the control information to the control portion a12. For example, when the reception processing portion a13 monitors the physical downlink control channel, the radio resource control portion a211 outputs the control information to the control portion a12 such that the reception processing portion a13 monitors the transmission power control format in the common search space of the anchor downlink component carrier for each of the uplink carrier component groups and monitors the downlink grant and the uplink grant addressed to the mobile station apparatus a2 in the common search space of the anchor downlink component carrier and in the user equipment-specific search space of each downlink carrier component.

The storing portion a213 of the upper layer processing portion a21 has the various kinds of setting information of the mobile station apparatus a2 managed by the radio resource control portion a211 and the transmission power control portion a112. FIG. 16 is a diagram of an example of the various kinds of setting information stored by the storing portion a213 according to the embodiment. In FIG. 16, such items are stored in the form of a table as the number of the anchor downlink component carrier set by the base station apparatus b2 for each of the uplink carrier component groups (the group including UCC-1 and UCC-2 and the group including UCC-3 and UCC-4) in the mobile station apparatus a2, and the identifiers (hexadecimal numbers) of the TPC-PUCCH-RNTI and the TPC-PUSCH-RNTI, and, for each TPC-PUCCH-RNTI and each TPC-PUSCH-RNTI, the number of the TPC command included in the transmission power control format that the uplink carrier component of the mobile station apparatuses a2 corresponds to and the value of the transmission power currently instructed to the mobile station apparatuses a2 using the TPC command.

For example, in FIG. 16, the storing portion a213 has such items stored therein as the various kinds of setting information set by the base station apparatus b2 for the group including UCC-1 and UCC-2 in the mobile station apparatus a2, "DCC-2" as the anchor downlink component carrier, "0001" as the TPC-PUCCH-RNTI, "2" as the number of the TPC command for the physical uplink control channel for UCC-1, "0 dBm" as the value of the TPC command for the physical uplink control channel of UCC-1, "3" as the number of the TPC command for the physical uplink control channel for UCC-2, "4 dBm" as the value of the TPC command for the physical uplink control channel of UCC-2, "0002" as the TPC-PUSCH-RNTI, "4" as the number of the TPC command for the physical uplink shared channel for UCC-1, "0 dBm" as the value of the TPC command for the physical uplink shared channel of UCC-1, "1" as the number of the TPC command for the physical uplink control channel for UCC-2, and "1 dBm" as the value of the TPC command for the physical uplink shared channel of UCC-2.

Figure 17:
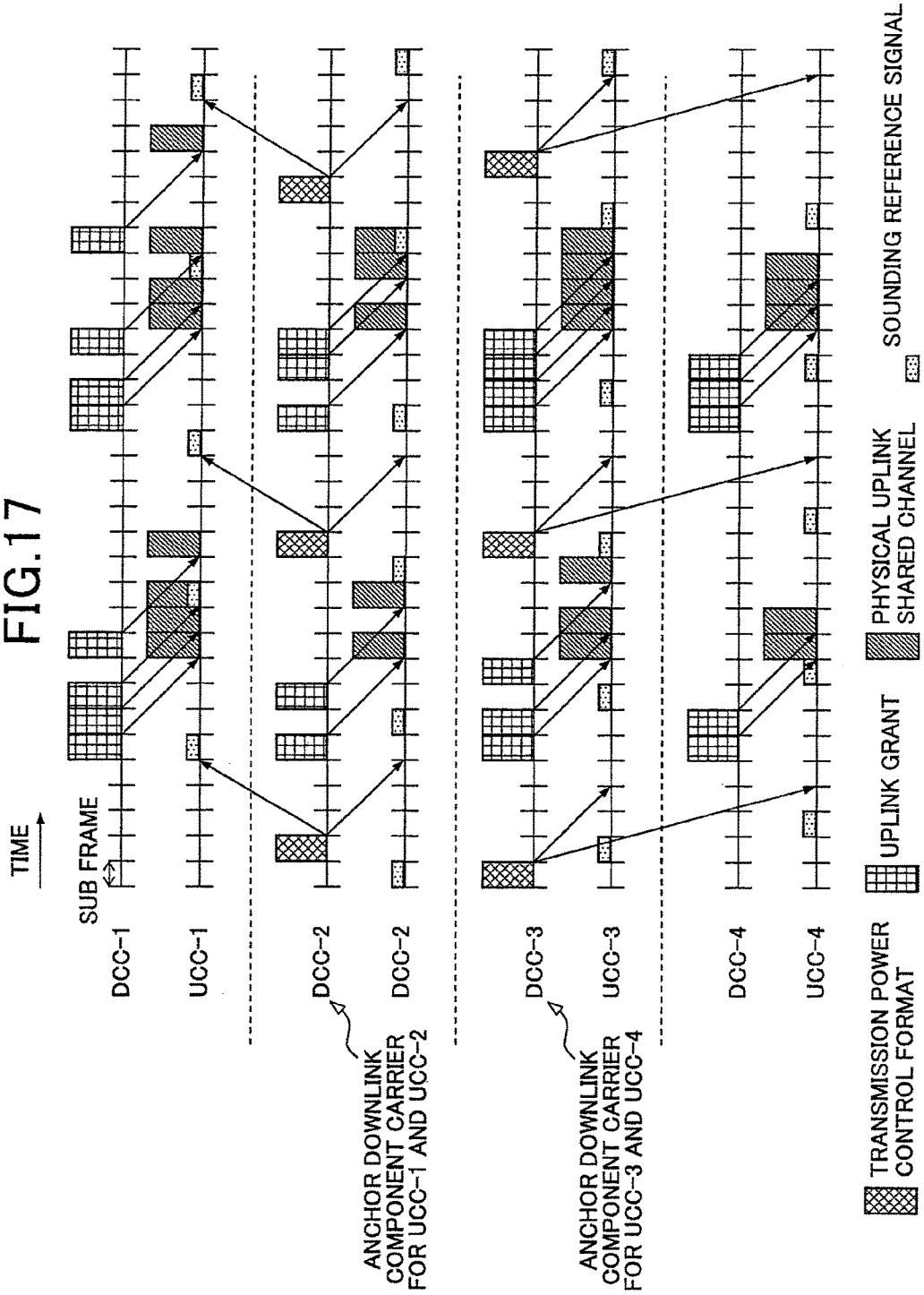
FIG. 17 is a diagram of a method of applying a TPC command to a physical uplink shared channel of the mobile station apparatus a2 according to the reference example.

FIG. 17 is a diagram of a method of applying the TPC command to the physical uplink shared channel of the mobile station apparatus a2 according to the embodiment. FIG. 17 depicts the case where the mobile station apparatus a2 is allocated with the four downlink carrier components (DCC-1, DCC-2, DCC-3, and DCC-4) and the four uplink carrier components (UCC-1, UCC-2, UCC-3, and UCC-4), and DCC-2 is set as the anchor downlink component carrier for the group including UCC-1 and UCC-2, and DCC-3 is set as the anchor downlink component carrier for the group including UCC-3 and UCC-4.

In FIG. 17, the axis of abscissa represents the time region, squares added therein with slant grid lines represent a transmission power control format including the TPC-PUSCH-RNTI allocated to the mobile station apparatus a2, squares added therein with longitudinal and lateral grid lines represent an uplink grant squares added therein with slant lines represent the physical uplink shared channel, squares added therein with dots represent the sounding reference signal, and thick arrows indicate the transmission power control format, the uplink carrier component that the TPC command for the the physical uplink shared channel and the sounding reference signal included in the uplink grant correspond to, and the time point at which the TPC command is applied with.

In FIG. 17, the TPC command included in the uplink grant received using DCC-1 is for UCC-1, the TPC command included in the uplink grant received using DCC-2 is for the uplink grant for UCC-2, the TPC command included in the uplink grant received using DCC-3 is for UCC-3, the transmission power control format received in the common search space of DCC-2 includes the TPC commands for UCC-1 and UCC-2, and the transmission power control format received in the common search space of DCC-3 includes the TPC commands for UCC-3 and UCC-4.

The sounding reference signal is allocated with cyclic radio resources for each uplink carrier component. The information and the TPC command concerning the physical uplink shared channel of the uplink grant received using each of the downlink carrier components DCC-i (i=1, 2, 3, and 4) are for each of the uplink carrier components UCC-i (i=1, 2, 3, and 4) four sub frames after the reception of the uplink grant. The TPC commands of the transmission power control formats received in the common search spaces of the anchor downlink component carriers DCC-2 and DDC-3 are for each of the uplink carrier components four sub frames after the reception of the transmission power control formats.

As above, according to the embodiment, in the radio communication system, the base station apparatus b2 groups the uplink carrier components in a similar environment based on the environment of each of the uplink carrier components such as the coverage of the uplink carrier component and interference from an adjacent base station apparatus b2 and, therefore, is able to collectively transmit the TPC commands for an uplink carrier component group. Therefore, the control is able to be efficiently executed of the transmission power suitable for the environment of the uplink carrier components.

(Second Reference Example)

A second reference example of the present invention will now be described in detail with reference to the accompanying drawings.

In the embodiment, the radio communication system has been described for the case where the base station apparatus b1 sets the one downlink carrier component to be the anchor downlink component carrier, of the plurality of downlink carrier components allocated by the base station apparatus b1 to the mobile station apparatus a1, and transmits the transmission power control format using the one anchor downlink component carrier set. In the reference example, the case will be described where a base station apparatus transmits the transmission power control format using one arbitrary downlink carrier component of a plurality of downlink carrier components allocated by the base station apparatus to a mobile station apparatus.

Comparing the radio communication system according to the reference example with the radio communication system according to the embodiment, an upper layer processing portion of the mobile station apparatus and an upper layer processing portion of the base station apparatus differ therebetween. However, the configuration and the functions that each of the other components has are the same as those of the first embodiment. Therefore, the same functions as those of the embodiment will not again be described. A mobile station apparatus according to the reference example will be referred to as "mobile station apparatus a3" and a base station apparatus according thereto will be referred to as "base station apparatus b3".

Figure 18:
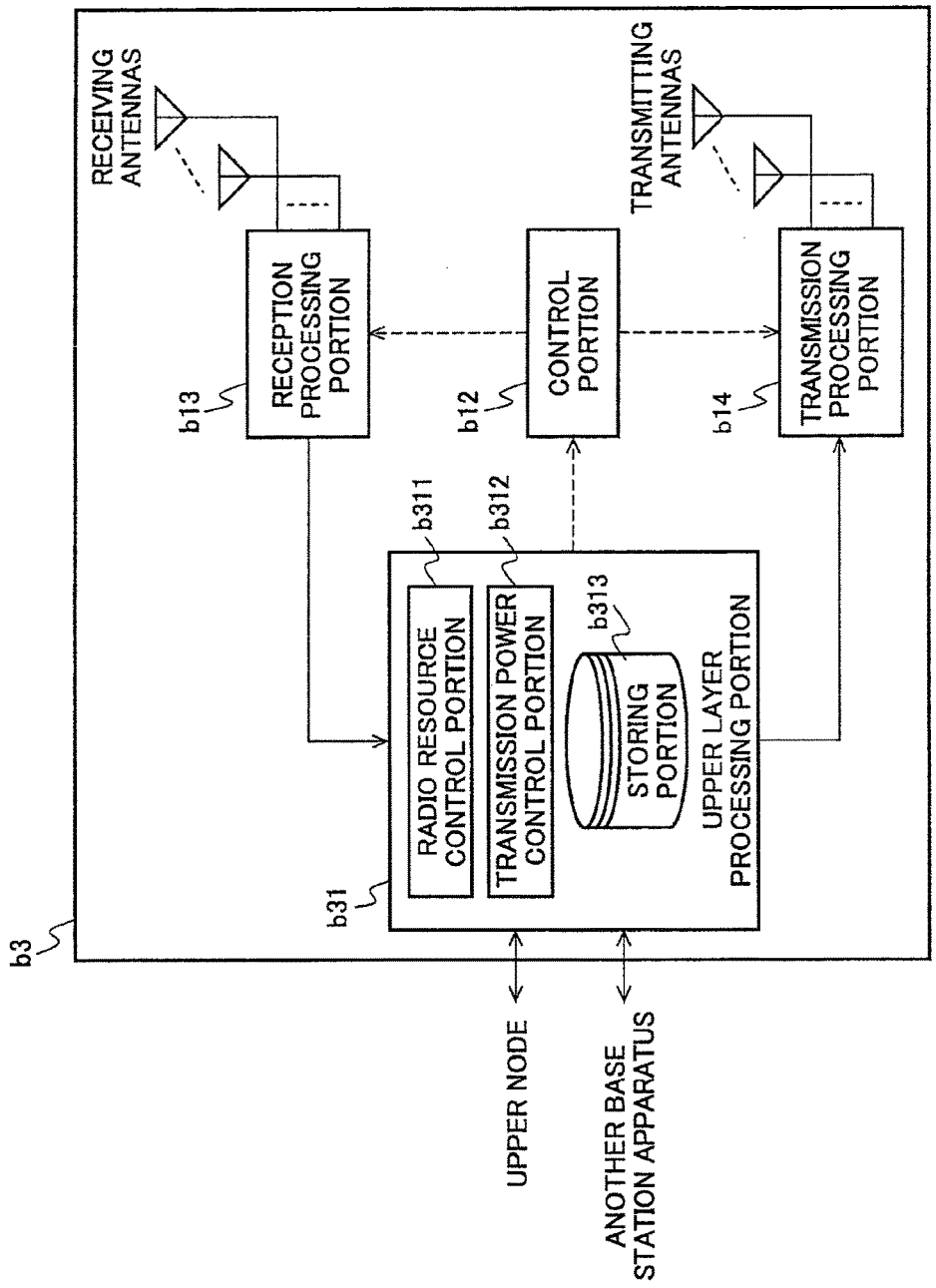
FIG. 18 is a schematic block diagram of the configuration of a base station apparatus b3 according to a second reference example of the present invention.

FIG. 18 is a schematic block diagram of the configuration of the base station apparatus b3 according to the second reference example of the present invention. Comparing an upper layer processing portion b31 according to the reference example (FIG. 18) with the upper layer processing portion b11 according to the embodiment (FIG. 5), a radio resource control portion b311, a transmission power control portion b312, and a storing portion b313 are different between the upper layer processing portions b31 and b11. However, the functions that the other components (the control portion b12, the reception processing portion b13, and the transmission processing portion b14) have are the same as those of the embodiment. The same functions as those of the embodiment will not again be described.

Processes of the upper layer processing portion b313 of the base station apparatus b3 will be described.

In the reference example, the upper layer processing portion b313 outputs the data information for each downlink carrier component to the transmission processing portion b14. The upper layer processing portion b31 executes processes for the packet data convergence protocol layer, the radio link control layer, and the radio resource control) layer. The radio resource control portion b311 of the upper layer processing portion b31 executes management, etc., of the various kinds of setting information, the communication state, and the buffer state of each of the mobile station apparatuses a3. The transmission power control portion b312 of the upper layer processing portion b31 executes management of the transmission power of the uplink of each of the mobile station apparatuses a3. The storing portion b313 of the upper layer processing portion b31 has the various kinds of setting information stored therein for each of the mobile station apparatuses a3 set by the radio resource control portion b311 and the transmission power control portion b312.

In the above processes, the radio resource control portion b311 included in the upper layer processing portion b31 allocates the plurality of uplink carrier components and the plurality of downlink carrier components to the mobile station apparatus a3 according to the number of downlink carrier components and the number of uplink carrier components that the base station apparatus b3 is able to use in the radio communication and the number of downlink carrier components and the number of uplink carrier components that the mobile station apparatus a2 is able to simultaneously transmit or receive. The radio resource control portion b311 allocates the C-RNTI to identify the downlink control information for the mobile station apparatus a3, and the TPC-PUCCH-RNTI and the TPC-PUSCH-RNTI to identify the transmission power control format for each anchor downlink component carrier, and the TPC command number, to the mobile station apparatus a3 and notifies the mobile station apparatus a3 of this allocation.

The radio resource control portion b311 produces the control information to execute control of the reception processing portion b13 and the transmission processing portion b14 based on the uplink control information (ACK/NACK, the channel quality information, the scheduling request, and the buffer state of the mobile station apparatus a3) notified of in the physical uplink control channel from the mobile station apparatus a3 and the various kinds of setting information of each of the mobile station apparatuses a3 set by the radio resource control portion b311, and the radio resource control portion b311 outputs the control information to the control portion b12. For example, when the transmission processing portion b14 allocates the transmission power control format, the radio resource control portion b311 outputs the control information to the control portion b12 such that a downlink carrier component having excellent propagation path quality is selected and the transmission power control format is allocated in the common search space of the downlink carrier component selected.

In the above processes, the transmission power control portion b312 included in the upper layer processing portion b31 produces the transmission power control format by combining the TPC commands for the mobile station apparatus a2 to which the same TPC-PUCCH-RNTIs or the same TPC-PUSCH-RNTIs are allocated.

The storing portion b313 of the upper layer processing portion b31 has the various kinds of setting information stored therein for each of the mobile station apparatuses a3 set by the radio resource control portion b311 and the transmission power control portion b312. FIG. 19 is a diagram of an example of the various kinds of setting information stored by the storing portion b313 according to the reference example. In FIG. 19, pieces of setting information are stored for N mobile station apparatuses (A1, A2, . . . , AN) and such items are stored in the form of a table as the identifiers (hexadecimal numbers) of the TPC-PUCCH-RNTI and the TPC-PUSCH-RNTI set for each of the mobile station apparatuses a3 by the radio resource control portion b311 and the transmission power control portion b312 of the upper layer processing portion b31, the number of each TPC command included in the transmission power control format that the uplink carrier component of each of the mobile station apparatuses a3 corresponds to for each TPC-PUCCH-RNTI and each TPC-PUSCH-RNTI, and the value of the transmission power currently instructed to each of the mobile station apparatuses using the TPC commands. The cells(grids) are blank for the number of the TPC command for the uplink carrier component not allocated by the base station apparatus b3 to the mobile station apparatus a3, and transmission power therefor.

For example, in FIG. 19, the storing portion b313 has such items stored therein as the various kinds of setting information set by the radio resource control portion b311 and the transmission power control portion b312 for the mobile station apparatus A1, "0001" as the TPC-PUCCH-RNTI, "2" as the number of the TPC command for the physical uplink control channel for UCC-1, "0 dBm" as the value of the TPC command for the physical uplink control channel of UCC-1, "3" as the number of the TPC command for the physical uplink control channel for UCC-2, "4 dBm" as the value of the TPC command for the physical uplink control channel of UCC-2, "4" as the number of the TPC command for the physical uplink control channel for UCC-3, "1 dBm" as the value of the TPC command for the physical uplink control channel of UCC-3, "0002" as the TPC-PUSCH-RNTI, "1" as the number of the TPC command for the physical uplink shared channel for UCC-1, "0 dBm" as the value of the TPC command for the physical uplink shared channel of UCC-1, "2" as the number of the TPC command for the physical uplink control channel for UCC-2, "4 dBm" as the value of the TPC command for the physical uplink shared channel of UCC-2, "3" as the number of the TPC command for the physical uplink control channel for UCC-3, and "1 dBm" as the value of the TPC command for the physical uplink control channel of UCC-3.

Figure 20:
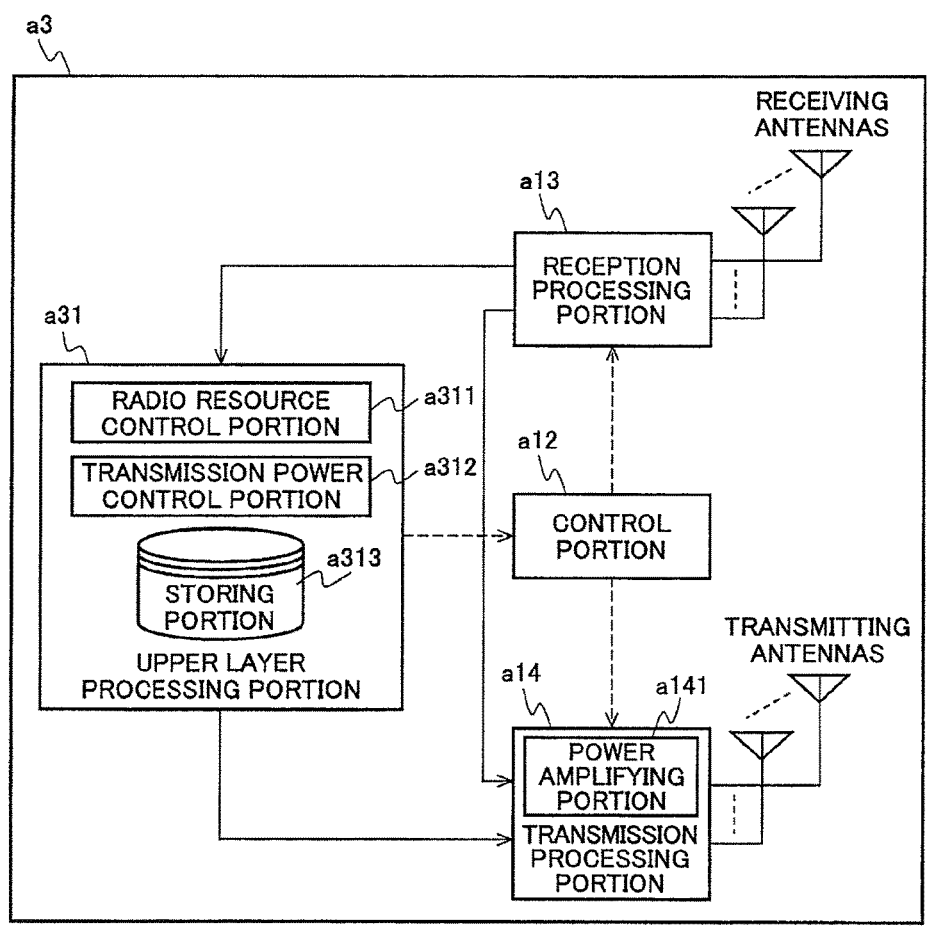
FIG. 20 is a schematic block diagram of the configuration of a mobile station apparatus a3 according to the second reference example of the present invention.

FIG. 20 is a schematic block diagram of the configuration of the mobile station apparatus a3 according to the second reference example of the present invention. Comparing an upper layer processing portion a31 according to the reference example (FIG. 20) with the upper layer processing portion a11 according to the embodiment (FIG. 7), a radio resource control portion a311 and a storing portion a313 are different between the upper layer processing portions a31 and a11. However, the functions that the other components (the transmission power control portion a112, the control portion a12, the reception processing portion a13, and the transmission processing portion a14) have are same as those of the embodiment. The same functions as those of the embodiment will not again be described.

Processes of the upper layer processing portion a31 of the mobile station apparatus a3 will be described below.

In the reference example, the upper layer processing portion a31 outputs data information of each uplink carrier component produced in response to an operation of a user, etc., to the transmission processing portion a14. The upper layer processing portion a31 executes processes for the packet data convergence protocol layer, the radio link control layer, and the radio resource control layer. The radio resource control portion a311 included in the upper layer processing portion a31 executes management, etc., of the various kinds of setting information, the communication state, and the buffer state of the mobile station apparatuses a3. The storing portion a313 of the upper layer processing portion a31 has the various kinds of setting information stored therein of the mobile station apparatuses a3 managed by the radio resource control portion a311 and the transmission power control portion a112.

In the above processes, the radio resource control portion a311 included in the upper layer processing portion a31 manages the various kinds of setting information such as the downlink carrier components and the uplink carrier components allocated to the mobile station apparatus a3, the C-RNTI, the TPC-PUCCH-RNTI, and the TPC-PUSCH-RNTI. The radio resource control portion a311 produces information to be allocated in each channel of each uplink carrier component and outputs the information to the transmission processing portion b14 for each uplink carrier component.

The radio resource control portion a311 produces the control information for executing the control of the reception processing portion b13 and the transmission processing portion b14 based on the downlink control information notified of from the base station apparatus b3 using the physical downlink control channel (for example, the downlink grant and the uplink grant) and the various kinds of setting information for the mobile station apparatus a3 managed by the radio resource control portion a311, and outputs the control information to the control portion b12. For example, when the reception processing portion b13 monitors the physical downlink control channel, the radio resource control portion a311 outputs the control information to the control portion b12 such that the reception processing portion b13 monitors the transmission power control format in the common search space of each of the downlink carrier components and monitors the the downlink grant and the uplink grant addressed to the mobile station apparatus a3 in the common search space and the user equipment-specific search space of each of the downlink carrier components.

The storing portion a313 of the upper layer processing portion a31 has various kinds of setting information stored therein for the mobile station apparatus a3 managed by the radio resource control portion a311 and the transmission power control portion a112. FIG. 21 is a diagram of an example of the various kinds of setting information stored by the storing portion a313 according to the reference example. In FIG. 21, such items are stored in the form of a table as the identifiers (hexadecimal numbers) of the TPC-PUCCH-RNTI and the TPC-PUSCH-RNTI set in the mobile station apparatus a3 by the base station apparatus b3, and the number of each TPC command included in the transmission power control format that the uplink carrier component of the mobile station apparatuses a3 corresponds to, for each TPC-PUCCH-RNTI and each TPC-PUSCH-RNTI; and the value of the transmission power currently instructed to the mobile station apparatuses a3 using the TPC command.

For example, in FIG. 16, the storing portion a313 has such items stored therein as the various kinds of setting information set by the base station apparatus b3 in the mobile station apparatus a3, "0001" as the TPC-PUCCH-RNTI, "2" as the number of the TPC command for the physical uplink control channel for UCC-1, "0 dBm" as the value of the TPC command for the physical uplink control channel of UCC-1, "3" as the number of the TPC command for the physical uplink control channel for UCC-2, "4 dBm" as the value of the TPC command for the physical uplink control channel of UCC-2, "4" as the number of the TPC command for the physical uplink shared channel for UCC-3, "1 dBm" as the value of the TPC command for the physical uplink control channel of UCC-3, "0002" as the TPC-PUSCH-RNTI, "1" as the number of the TPC command for the physical uplink shared channel for UCC-1, "0 dBm" as the value of the TPC command for the physical uplink shared channel of UCC-1, "2" as the number of the TPC command for the physical uplink control channel for UCC-2, "4 dBm" as the value of the TPC command for the physical uplink shared channel of UCC-2, "3" as the number of the TPC command for the physical uplink control channel for UCC-3, and "1 dBm" as the value of the TPC command for the physical uplink control channel of UCC-3.

FIG. 22 is a diagram of a method of applying a TPC command to a physical uplink shared channel of the mobile station apparatus a3 according to the reference example. FIG. 22 depicts the case where the mobile station apparatus a3 is allocated with the downlink carrier components (DCC-1, DCC-2, and DCC-3) and the uplink carrier components (UCC-1, UCC-2, and UCC-3) as depicted in FIG. 2.

In FIG. 22, the axis of abscissas represents the time region, squares added therein with slant grid lines each represent a transmission power control format including the TPC-PUSCH-RNTI allocated to the mobile station apparatus a3, squares added therein with longitudinal and lateral grid lines each represent an uplink grant, squares added therein with slant lines each represent the physical uplink shared channel, squares added therein with dots each represent the sounding reference signal, and thick arrows each represent the transmission power control format, the uplink carrier component that the TPC command for the physical uplink shared channel and the sounding reference signal included in the uplink grant correspond to, and the time point at which the TPC command is applied with.

In FIG. 22, the TPC command included in the uplink grant received using DCC-1 is for UCC-1; the TPC command included in the uplink grant received using DCC-2 is for the uplink grant for UCC-2; the TPC command included in the uplink grant received using DCC-3 is for UCC-3; and the transmission power control format received in the common search space of each of the downlink carrier components (DCC-1, DCC-2, and DCC-3) includes the TPC command for each of the uplink carrier components (UCC-1, UCC-2, and UCC-3). The mobile station apparatus a3 only simultaneously receives one transmission power control format.

The sounding reference signal is allocated with cyclic radio resources for each uplink carrier component. The information and the TPC command concerning the physical uplink shared channel of the uplink grant received using each of the downlink carrier components DCC-i (i=1, 2, and 3) are for each of the uplink carrier components UCC-i (i=1, 2, and 3) three sub frames after the reception of the uplink grant. The TPC command of the transmission power control format received in the common search space of each of the downlink carrier components is for each of the uplink carrier components three sub frames after the reception of the transmission power control format.

As above, according to the reference example, in the radio communication system, the transmission power control format is monitored using all the downlink carrier components set in the mobile station apparatus a3 by the base station apparatus b3 and, therefore, the base station apparatus b3 is able to allocate the transmission power control format in the common search spaces of all the downlink carrier components set in the mobile station apparatus a3. Therefore, the degree of freedom of the allocation of the transmission power control format is able to be increased enabling selection by the base station apparatus b3 of the downlink carrier components each having excellent quality or selection of the downlink carrier components each having a small amount of overhead for the physical downlink control channel.

In the embodiment, the base station apparatus b1 may set the anchor downlink component carriers allocated to the mobile station apparatus a1 all to be same downlink carrier components. Thereby, the base station apparatus b1 does not need to set and manage the anchor downlink component carrier for each of the mobile station apparatuses a1 and, therefore, the configuration of the base station apparatus b1 is able to be simplified.

In the embodiment, the base station apparatus b1 configures the transmission power control format using the plurality of TPC commands each having the same number of bits. However, the base station apparatus b1 may configure a TPC command of a new format using fields of a plurality of PTC commands each having the same number of bits. The base station apparatus b1 is able to set the fields of the plurality of TPC commands for the uplink carrier components for each of the mobile station apparatuses a1 use all of the bits of the fields of the plurality of TPC commands and, thereby, notify of the TPC command common to the uplink carrier components, the TPC command for each of the uplink carrier components, etc. This format is determined in advance. Otherwise, this format is able to be set.

The base station apparatus b1 may set the configuration of the TPC command for each of the mobile station apparatuses a1 such as the number of bits of the TPC command for the uplink carrier component and notify the mobile station apparatus a1 of the configuration of the TPC command set and the area (field) that includes the TPC command for the mobile station apparatus a1 included in the transmission power control format. Thereby, the base station apparatus b1 is able to transmit the TPC command of the configuration suitable for each of the mobile station apparatuses a1.

In the first reference example, the base station apparatus b2 may configure a different group of the uplink carrier components for each of the mobile station apparatuses a2. Thereby, the transmission power may more efficiently be controlled taking into account not only the environment of the uplink carrier components but also the environment of the mobile station apparatus a2.

The programs run in the base station apparatus and the mobile station apparatuses concerning the present invention may also be programs that control a CPU (Central Processing Unit), etc., (programs that cause a computer to function) such that the functions in the embodiments concerning the present invention are realized. The pieces of information handled by the apparatuses are temporarily accumulated in a RAM (Random Access Memory) during the processes thereafter, are stored in various ROMs (Read Only Memories) and HDDs (Hard Disk Drive) such as a flash ROM and are read, corrected, and written by the CPU when necessary.

A part of the mobile station apparatuses a1 to a3 and the base station apparatuses b1 to b3 in the embodiments may be realized by computers. In such a case, a program to realize this control function may be recorded in a computer-readable recording medium a computer system may be caused to read and execute the program recorded in the recording medium and, thereby, the control function may be realized. The "computer system" used herein refers to a computer system that is incorporated in each of the mobile station apparatuses a1 to a3 or the base station apparatuses b1 to b3 and that includes an OS and hardware such as a peripheral device. The "computer-readable recording medium" refers to a portable medium such as a flexible disc, a magneto-optical disc, a ROM, or a CD-ROM, or a storing apparatus such as a hard disc incorporated in the computer system. The "computer-readable recording medium" may include a type thereof that dynamically retains the programs for a short time period such as a communication cable used when the programs are transmitted through a network such as the Internet or a communication line such as a telephone line and, in such a case, a type thereof that retains the programs for a specific time period such as a volatile memory in a computer system used as a server or a client. The "programs" may be programs to realize a part of the above functions, or may also be programs that are able to realize the part in combination with the programs already recorded in the computer system.

A part or all of the mobile station apparatuses a1 to a3 and the base station apparatuses b1 to b3 in the embodiments may typically be realized as an LSI that is an integrated circuit, or may be realized as a chip set formed by combining a plurality of integrated circuits. Each of the functional blocks of the mobile station apparatuses a1 to a3 and the base station apparatuses b1 to b3 may individually be implemented in a chip, or a part or all thereof may be integrated and implemented in a chip. The approach of implementing those blocks in an integrated circuit is not limited to an LSI and those blocks may be realized by a dedicated circuit or a multi-purpose processor. When a technique of implementing those blocks in an integrated circuit supersedes the LSI due to the advancement of the semiconductor technology, the integrated circuit by the technique may be used.

As above, the embodiment of the present invention has been described in detail with reference to the accompanying drawings. However, the specific configuration thereof is not limited to the above and various design changes, etc., are able to be made thereto within the scope not departing from the purview of the present invention.

EXPLANATIONS OF LETTERS OR NUMERALS

Mobile station apparatus . . . a1, a2, a3, base station apparatus . . . b1, b2, b3, upper layer processing portion . . . a11, a21, a31, radio resource control portion . . . a111, a211, a311, transmission power control portion . . . a112, storing portion . . . a113, a213, a313, control portion . . . a12, reception processing portion . . . a13, transmission processing portion . . . a14, power amplifying portion . . . a141, upper layer processing portion . . . b11, b21, b31, radio resource control portion . . . b111, b211, b311, transmission power control portion . . . b112, b212, b312, storing portion . . . b113, b213, b313, control portion . . . b12, reception processing portion b13, transmission processing portion b14.

The invention claimed is:

1. A mobile station apparatus comprising:
a radio resource controller configured to configure a first Radio Network Temporary Identifier (RNTI) and a second RNTI; and
a receiver configured to receive:
  a first physical downlink control channel with first downlink control information on a first common search space in a first downlink component carrier, first cyclic redundancy check bits being attached to the first downlink control information, and the first cyclic redundancy check bits being scrambled by the first RNTI;
  a second physical downlink control channel with second downlink control information on a second common search space in a second downlink component carrier, the second, common search space being different from the first common search space, the second downlink component carrier being different from the first downlink component carrier, second cyclic redundancy check bits being attached to the second downlink control information, and the second cyclic redundancy check bits being scrambled by the second RNTI; and
  a physical downlink shared channel in each of more than two downlink component carriers, the more than two downlink component carriers including the first downlink component carrier and the second downlink component carrier, wherein
the first downlink component carrier and the second downlink component carrier are indicated by a higher layer.

2. The mobile station apparatus according to claim 1, wherein
the radio resource controller is further configured to configure a first group including at least one component carrier and a second group including at least one component carrier,
a first Transmission Power Control (TPC) command included in the first downlink control information is applied to a first uplink component carrier within the first group, and
a second TPC command included in the second downlink control information is applied to a second uplink component carrier within the second group.

3. A base station apparatus comprising:
a radio resource controller configured to configure a first Radio Network Temporary Identifier (RNTI) and a second RNTI for a mobile station apparatus; and
a transmitter configured to transmit to the mobile station apparatus:
  a first physical downlink control channel with first downlink control information on a first common search space in a first downlink component carrier, first cyclic redundancy check bits being attached to the first downlink control information, and the first cyclic redundancy check bits being scrambled by the first RNTI;
  a second physical downlink control channel with second downlink control information on a second common search space in a second downlink component carrier, the second common search space being different from the first common search space, the second downlinks component carrier being different from the first downlink component carrier, second cyclic redundancy check bits being attached to the second downlink control information, and the second cyclic redundancy check bits being scrambled by the second RNTI; and
  a physical downlink shared channel in each of more than two downlink component carrier, the more than two downlink component carrier including the first downlink component carrier and the second downlink component carrier, wherein
the first downlink component carrier and the second downlink component carrier are indicated by a higher layer.

4. The base station apparatus according to claim 3, wherein
the radio resource controller is further configured to configure a first group including at least one component carrier and a second group including at least one component carrier for the mobile station apparatus,
a first Transmission Power Control (TPC) command included in the first downlink control information is applied to a first uplink component carrier within the first group, and
a second TPC command included in the second downlink control information is applied to a second uplink component carrier within the second group.

5. A communication method of a mobile station apparatus comprising:

configuring a first Radio Network Temporary Identifier (RNTI) and a second RNTI; and receiving:
- a first physical downlink control channel with first downlink control information on a first common search space in a first downlink component carrier, first cyclic redundancy check bits being attached to the first downlink control information, and the first cyclic redundancy check bits being scrambled by the first RNTI;
- a second physical downlink control channel with second downlink control information on a second common search space in a second downlink component carrier, the second common search space being different from the first common search space, the second downlink component carrier being different from the first downlink component carrier, second cyclic redundancy check bits being attached to the second downlink control information, and the second cyclic redundancy check bits being scrambled by the second RNTI; and
- a physical downlink shared channel in each of more than two downlink component carriers, the more than two downlink component carrier including the first downlink component carrier and the second downlink component carrier, wherein the first downlink component carrier and the second downlink component carrier are indicated by a higher layer.

6. A communication method of a base station apparatus comprising:

configuring a first Radio Network Temporary Identifier (RNTI) and a second RNTI for a mobile station apparatus: and transmitting to the mobile station apparatus:
- a first physical downlink control channel with first downlink control information on a first common search space in a first downlink component carrier, first cyclic redundancy check bits being attached to the first downlink control information, and the first cyclic redundancy check bits being scrambled by the first RNTI;
- a second physical downlink control channel with second downlink control information on a second common search space in a second downlink component carrier, the second common search apace being different from the first common search space, the second downlink component carrier being different from the first downlink component carrier second cyclic redundancy check bits being attached to the second downlink control information, and the second cyclic redundancy check bits being scrambled by the second RNTI; and
- a physical downlink shared channel in each of more than two downlink component carrier, the more than two downlink component carrier including the first downlink component carrier and the second downlink component carrier, wherein the first downlink component carrier and the second downlink component carrier are indicated by a higher layer.

* * * * *